United States Patent
Itakura et al.

(10) Patent No.: US 12,346,858 B2
(45) Date of Patent: Jul. 1, 2025

(54) SYSTEM AND METHOD FOR PLANNING HYDROGEN MANUFACTURING TO MEET ENERGY DEMAND, SYSTEM AND METHOD FOR ENERGY GENERATION OPERATIONAL PLANNING UTILIZING PHOTOVOLTAIC PRODUCTION AND HYDROGEN MANUFACTURING

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Akihiro Itakura, Kawasaki Kanagawa (JP); Toshimitsu Kumazawa, Yokohama Kanagawa (JP)

(73) Assignees: Kabushiki Kaisha Toshiba, Tokyo (JP); Toshiba Energy Systems & Solutions Corporation, Kawasaki Kanagawa (JP)

( * ) Notice: Subject to any disclaimer, the term of this patent is extended or adjusted under 35 U.S.C. 154(b) by 209 days.

(21) Appl. No.: 18/174,833

(22) Filed: Feb. 27, 2023

(65) Prior Publication Data
US 2024/0005239 A1  Jan. 4, 2024

(30) Foreign Application Priority Data
Jul. 1, 2022 (JP) ................. 2022-107249

(51) Int. Cl.
*G06Q 10/0631* (2023.01)
*G06Q 50/04* (2012.01)

(52) U.S. Cl.
CPC ....... *G06Q 10/06315* (2013.01); *G06Q 50/04* (2013.01)

(58) Field of Classification Search
CPC .... G06Q 50/06; G06Q 10/06315; H02J 3/466
See application file for complete search history.

(56) References Cited

U.S. PATENT DOCUMENTS 8,903,554 B2 * 12/2014 Stagner .................. G06Q 10/00
  700/278
8,930,035 B2 *  1/2015 Marroyo Palomo .. G06Q 10/06
  700/287

(Continued)

FOREIGN PATENT DOCUMENTS

CN    114134512 A    3/2022
JP    2003-134665 A  5/2003
(Continued)

*Primary Examiner* — Scott L Jarrett
(74) *Attorney, Agent, or Firm* — Finnegan, Henderson, Farabow, Garrett & Dunner, LLP

(57) ABSTRACT

According to one embodiment an information processing device includes processing circuitry. The processing circuitry acquires operation data of an energy system which includes a power generation device configured to generate power based on an environmental condition, a manufacturing device configured to be able to manufacture a demanded amount using power generated by the power generation device, a storage device configured to be able to store the demanded amount manufactured by the manufacturing device and a supply device configured to be able to supply the demanded amount in the storage device to a demand device. The processing circuitry creates an operation plan of the energy system based on the operation data and at least one of data related to the environmental condition or first demand data related to the demanded amount necessary for the demand device.

13 Claims, 15 Drawing Sheets

(56) References Cited

U.S. PATENT DOCUMENTS

| | | | |
|---|---|---|---|
| 9,057,138 B2* | 6/2015 | Stuermer | C10L 3/08 |
| 9,438,041 B2* | 9/2016 | Roy | H02J 3/381 |
| 9,727,036 B2* | 8/2017 | Taniguchi | H01M 10/44 |
| 9,800,052 B2* | 10/2017 | Li | H02J 3/46 |
| 10,094,275 B2* | 10/2018 | Devarakonda | F01N 3/20 |
| 11,056,912 B1* | 7/2021 | Wells | H02J 3/466 |
| 11,271,400 B2* | 3/2022 | Yabe | H02J 3/14 |
| 11,807,126 B2* | 11/2023 | Orihashi | B60L 58/30 |
| 11,913,126 B2* | 2/2024 | Akiba | H02J 3/144 |
| 12,078,975 B2* | 9/2024 | Nagino | G05B 19/042 |
| 2010/0259044 A1* | 10/2010 | Muchow | E03B 11/12 |
| | | | 137/565.17 |
| 2012/0010758 A1* | 1/2012 | Francino | G05B 17/02 |
| | | | 700/291 |
| 2012/0186252 A1* | 7/2012 | Schmidt | F22B 1/18 |
| | | | 60/676 |
| 2012/0215362 A1* | 8/2012 | Stagner | G06Q 10/00 |
| | | | 700/278 |
| 2013/0006431 A1* | 1/2013 | Marroyo Palomo | G06Q 10/06 |
| | | | 700/287 |
| 2014/0039708 A1* | 2/2014 | Curtis | F25B 27/00 |
| | | | 290/2 |
| 2014/0200723 A1* | 7/2014 | Roy | H02J 3/46 |
| | | | 700/291 |
| 2014/0358307 A1* | 12/2014 | Taniguchi | H02J 7/00 |
| | | | 700/291 |
| 2015/0184549 A1* | 7/2015 | Pamujula | F02C 9/28 |
| | | | 700/287 |
| 2019/0369572 A1* | 12/2019 | Watanabe | H02J 3/003 |
| 2021/0305605 A1 | 9/2021 | Akiba et al. | |
| 2021/0399575 A1* | 12/2021 | Nagino | G05B 15/02 |
| 2021/0405603 A1* | 12/2021 | Nagino | G05B 19/042 |
| 2022/0302708 A1 | 9/2022 | Kumazawa | |
| 2023/0129742 A1* | 4/2023 | Yamasaki | H02J 3/00 |
| | | | 705/37 |

FOREIGN PATENT DOCUMENTS

| | | |
|---|---|---|
| JP | 2022-143510 A | 10/2022 |
| WO | WO 2018/069993 A1 | 4/2018 |

\* cited by examiner

SYSTEM AND METHOD FOR PLANNING HYDROGEN MANUFACTURING TO MEET ENERGY DEMAND, SYSTEM AND METHOD FOR ENERGY GENERATION OPERATIONAL PLANNING UTILIZING PHOTOVOLTAIC PRODUCTION AND HYDROGEN MANUFACTURING

CROSS REFERENCE TO RELATED APPLICATIONS

This application is based upon and claims the benefit of priority from the prior Japanese Patent Application No. 2022-107249, filed on Jul. 1, 2022, the entire contents of which are incorporated herein by reference.

FIELD

Embodiments described herein relate to an information processing device, an information processing method, a non-transitory computer readable medium and an information processing system.

BACKGROUND

In recent years, renewable energy hydrogen systems have been attracting attention as energy systems utilizing renewable energy as CO2 reduction measures and BCP (business continuity plan) measures in case of disaster. A control method (hysteresis banding method) that self-consumes as much renewable energy as possible in combination with a storage battery is generally used as a method for controlling the renewable energy hydrogen systems. Considering electric power cost, a method for controlling hydrogen storage devices and power generation devices in a consumer is known as a specific example.

As the renewable energy hydrogen systems require economic rationality, it is believed that more operations will be conducted from a long-term perspective in the future. In this case, the requirements for the renewable energy hydrogen systems include direct supply of hydrogen, improvement of a renewable energy utilization rate, net zero (NetZero) of electric power supply, reduction in peak power of grid power or the like. Creation of a plan that satisfies such requirements will enable efficient operation of energy systems that satisfy economic rationality.

DETAILED DESCRIPTION

Figure 1:
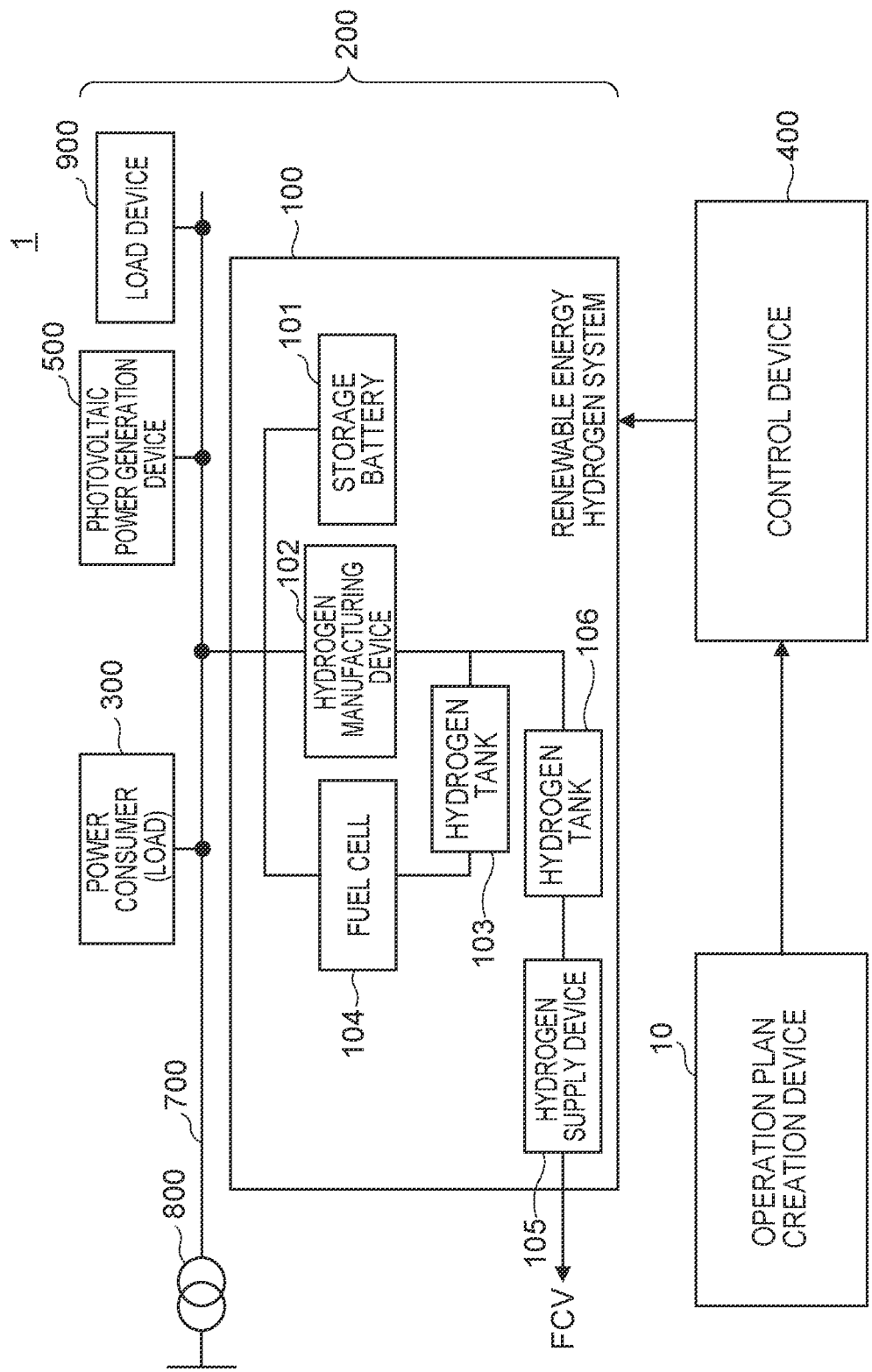
FIG. 1 is a block diagram illustrating an overall configuration of an information processing system according to a first embodiment.

According to one embodiment an information processing device includes processing circuitry. The processing circuitry acquires operation data of an energy system which includes a power generation device configured to generate power based on an environmental condition, a manufacturing device configured to be able to manufacture a demanded amount using power generated by the power generation device, a storage device configured to be able to store the demanded amount manufactured by the manufacturing device and a supply device configured to be able to supply the demanded amount in the storage device to a demand device. The processing circuitry creates an operation plan of the energy system based on the operation data and at least one of data related to the environmental condition or first demand data related to the demanded amount necessary for the demand device.

Hereinafter, embodiments of the present invention will be described with reference to the accompanying drawings. In the drawings, elements having identical or equivalent functions are given identical reference numerals and detailed descriptions will be omitted as appropriate except for extended or changed processes.

First Embodiment

FIG. 1 is a block diagram illustrating an overall configuration of an information processing system 1 according to a first embodiment. The information processing system 1 is provided with an energy system 200, an operation plan creation device 10 that creates an operation plan of the energy system 200 and a control device 400 that controls the energy system 200 based on the operation plan. The operation plan creation device 10 or a pair of the operation plan creation device 10 and the control device 400 (controller) corresponds to an information processing device according to the present embodiment.

The energy system 200 includes components such as a renewable energy hydrogen system 100, a photovoltaic power generation device 500, a power consumer (load) 300 and a load device 900. The renewable energy hydrogen system 100 can receive and transmit (reverse current) power from/to a power line (bus) 700, and is connected to a power grid 800 via the power line (bus) 700. Receiving power from the power grid 800 corresponds to buying power and transmitting power to the power grid 800 corresponds to selling power.

In addition to the renewable energy hydrogen system 100, the photovoltaic power generation device 500, the power consumer 300, the load device 900 and the like are connected to the power line 700. The power consumer 300 corresponds to an example of the load (power consumption device) that consumes power. The load device 900 is also an example of the power consumption device, and the load device 900 may be a device such as a motor or may be any power consumption device on premises. The photovoltaic power generation device 500 is a device that converts light energy of the sun to power as an environmental condition and outputs the converted power to the power line 700. Although one photovoltaic power generation device 500, one power consumer 300 and one load device 900 are shown in the example in FIG. 1, there may be more than one such device. Furthermore, a wind power generation device or the like other than the photovoltaic power generation device may be connected to the power line 700 as a power generation device using natural energy. The wind power generation device is a device that converts wind power to electric power as an environmental condition.

The renewable energy hydrogen system 100 is provided with a storage battery 101, a hydrogen manufacturing device (EC) 102, a hydrogen tank 103 (storage device), a fuel cell (FC) 104, a hydrogen supply device 105 and a hydrogen tank 106 (storage device).

The storage battery 101 charges/discharges power according to control information (operation command value) supplied from the control device 400. Charging/discharging includes at least one of charging and discharging. In the case of charging, the storage battery 101 charges surplus power. For example, the surplus power includes power generation by the photovoltaic power generation device 500 and power that remains unconsumed in the power consumer 300, the load device 900, and the hydrogen manufacturing device 102 or the like of the power received from the power grid 800. In the case of discharging, the storage battery 101 discharges power stored in the power line 700. The discharged power can be consumed in the power consumer 300, the load device 900 or the hydrogen manufacturing device 102 or the like or can be transmitted to the power grid 800.

The hydrogen manufacturing device 102 manufactures hydrogen as a demanded amount using power supplied from the power line 700 (power received from the power grid 800 may also be included) according to control information supplied from the control device 400. The hydrogen manufacturing device 102 is also an example of the power consumption device that consumes power. The hydrogen manufacturing device 102 transmits the manufactured hydrogen to at least one of the hydrogen tank 103 and the hydrogen tank 106. The hydrogen manufacturing device 102 manufactures hydrogen using power by an electrolytic method represented by alkaline water electrolysis. Although hydrogen is handled as a demand amount in the present embodiment, any gas other than hydrogen, liquid or solid, or intangible substance such as electric power may be used depending on a supply target in demand (demand device).

The hydrogen tank 103 is a storage device that receives hydrogen for the fuel cell 104 manufactured by the hydrogen manufacturing device 102 and internally stores the hydrogen. The hydrogen tank 106 is a storage device that receives hydrogen for FCV manufactured by the hydrogen manufacturing device 102 and internally stores the hydrogen. The hydrogen tank 103 and the hydrogen tank 106 are high-pressure hydrogen gas containers (hydrogen pressure accumulators) or hydrogen absorbing alloy containers or the like. The hydrogen tank 103 has a function to provide the stored hydrogen to the fuel cell 104 and a function to measure the storage amount of stored hydrogen. The hydrogen tank 106 has a function to provide the stored hydrogen to the hydrogen supply device 105 and a function to measure the storage amount of the stored hydrogen.

The fuel cell 104 generates power using the hydrogen supplied from the hydrogen tank 103 and supplies the generated power to the power line 700. The fuel cell 104 is, for example, solid polymer type or solid oxide type fuel cell. Any device other than the fuel cell may also be used as long as the device has a function to generate power using hydrogen.

The hydrogen supply device 105 has a function to receive hydrogen stored in the hydrogen tank 106 and supply the received hydrogen to an FCV, an external demand device. The external demand device is a hydrogen fuel cell vehicle (FCV) in the present embodiment. In this case, hydrogen can be used as a fuel for fuel cell vehicles. The external demand vehicle is not limited to FCV as long as it is the device that operates using hydrogen.

The operation plan creation device 10 creates an operation plan for the energy system 200. As an operation plan, the operation plan creation device 10 creates a hydrogen manufacturing plan to store hydrogen in the hydrogen tank 106 or a storage amount plan that is a hydrogen (demand amount) storage amount transition plan in the hydrogen tank 106. The operation plan creation device 10 may also create a plan related to accumulation of power to be transmitted/received to/from the power grid 800 (power supply-demand plan).

The FCV hydrogen manufacturing plan represents a hydrogen manufacturing plan in a short period until a point in time of hydrogen supply to the FCV in the present embodiment. The manufacturing plan can be expressed, for example, by a graph with time on the horizontal axis and the amount of hydrogen manufactured on the vertical axis. Instead of the manufacturing plan or together with the manufacturing plan, a storage amount plan of hydrogen in the hydrogen tank 106 may also be created. The hydrogen storage amount plan represents a transition of hydrogen storage amount (residual amount) when the hydrogen manufactured by the manufacturing plan is stored in the hydrogen tank 106 and the hydrogen supplied from the hydrogen tank 106 to the FCV is outputted from the hydrogen tank 106 (see FIG. 4A, FIG. 9).

The power supply-demand plan in the present embodiment shows a plan of cumulative power amount with the power grid 800 in a short period until the supply point in time of hydrogen to the FCV. The power supply-demand plan can be expressed, for example, by a graph with time on the horizontal axis and the cumulative amount of power transmitted/received to/from the power grid 800 on the vertical axis. A cumulative amount of power of 0 or less means that power is covered by the power generation by the energy system 200 substantially without receiving power from the power grid 800 (Netzero).

The control device 400 collects operation data of each device of the energy system 200.

The operation data of the storage battery 101 includes, for example, transition of a power charged in the storage battery 101 or a history of charge/discharge (time and amount of power charged/discharged or the like).

The operation data of the hydrogen manufacturing device 102 includes, for example, the amount of power used for hydrogen manufacturing and a hydrogen manufacturing history (time and hydrogen manufacturing amount or the like).

The operation data of the fuel cell 104 may include, for example, a power generation history (time and amount of power generated or the like) and an amount of hydrogen used for power generation.

The operation data of the hydrogen tank 103 includes, for example, a history of amount of hydrogen stored (time and amount of hydrogen or the like).

The operation data of the hydrogen tank 106 includes, for example, a history of amount of hydrogen stored (time and amount of hydrogen or the like).

The operation data of the hydrogen supply device 105 includes, for example, a history of hydrogen supplied to an external demand device (FCV) (time and amount of hydrogen or the like).

The operation data of the photovoltaic power generation device 500 includes, for example, a power generation history (time and amount of power generation or the like).

The operation data of the power consumer 300 includes, for example, a power consumption history (time and power consumption amount or the like).

The operation data of the power grid 800 includes a history of power transmitted/received to/from the power grid 800 (time and amount of power transmitted/received or the like).

The control device 400 controls the renewable energy hydrogen system 100 or the energy system 200 so as to satisfy an operation plan (hydrogen manufacturing plan/hydrogen storage amount plan, power supply-demand plan) based on the collected operation data. Each device of the energy system 200 controls the storage battery 101, the hydrogen manufacturing device 102 and the fuel cell 104. Each device of the energy system 200 includes the storage battery 101, the hydrogen manufacturing device 102, the hydrogen tank 103, the fuel cell 104, the hydrogen supply device 105, the hydrogen tank 106, the power consumer 300, the photovoltaic power generation device 500 and the load device 900. As examples of controlling the renewable energy hydrogen system 100 or the energy system 200, the control device 400 controls power generation by the fuel cell 104, manufacturing of hydrogen to be stored in the hydrogen tank 106 by the hydrogen manufacturing device 102, manufacturing of hydrogen to be stored in the hydrogen tank 103 by the hydrogen manufacturing device 102, charging of the storage battery 101, discharging of the storage battery 101, selling power to the power grid 800, buying power from the power grid 800 or the like.

The operation plan creation device 10 according to the present embodiment creates operation plans (e.g., hydrogen manufacturing plan/hydrogen storage amount plan, power supply-demand plan) to control the renewable energy hydrogen system 100 or the energy system 200 as plans to enable economically efficient operations.

Figure 2:
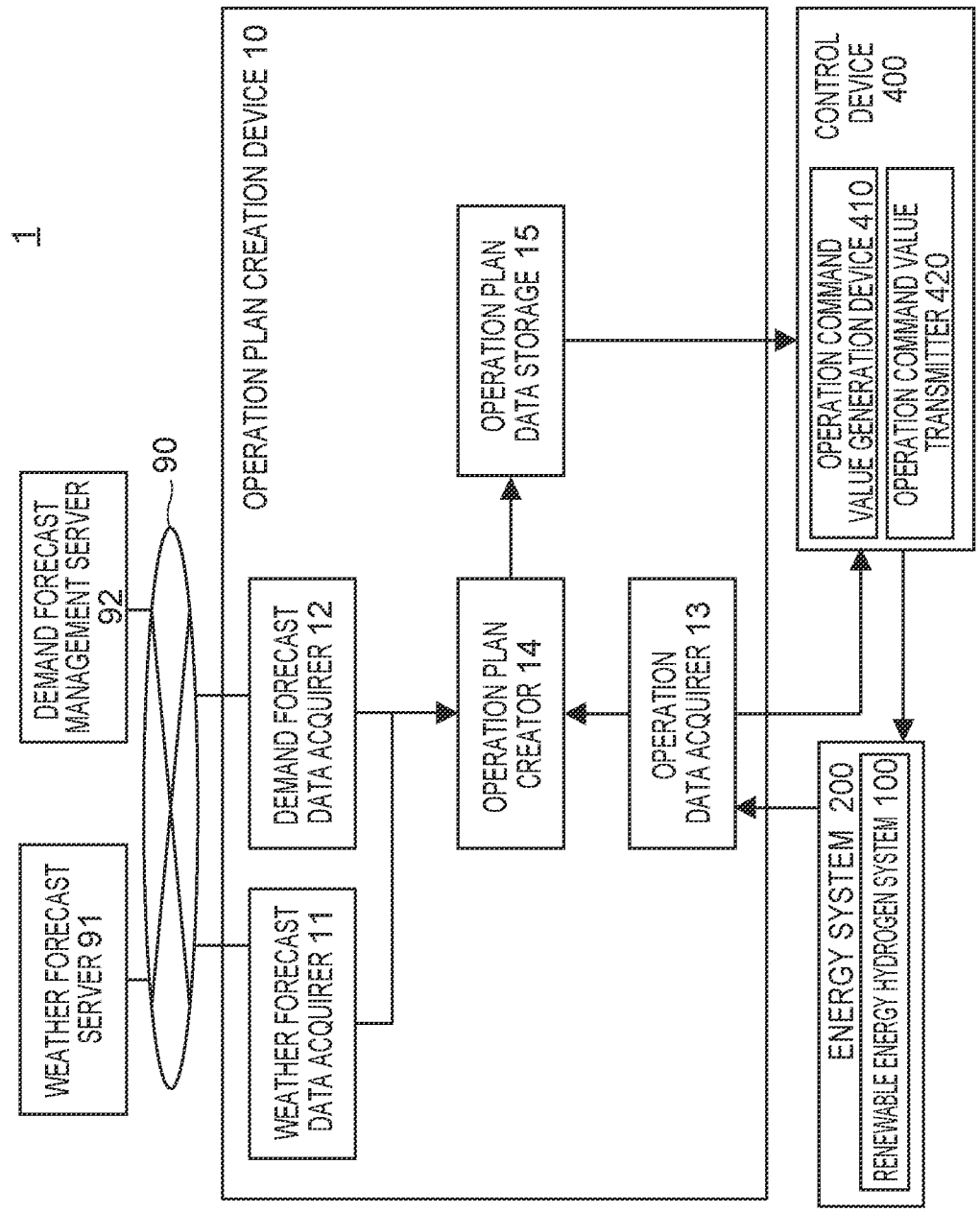
FIG. 2 is a block diagram illustrating an example of an operation plan creation device.

FIG. 2 is a block diagram illustrating an example of the operation plan creation device 10. The operation plan creation device 10 creates an operation plan using weather forecast data.

The operation plan creation device 10 is provided with a weather forecast data acquirer 11, a demand forecast data acquirer 12, an operation data acquirer 13, an operation plan creator 14 (plan creator) and an operation plan data storage 15. The weather forecast data acquirer 11 is connected to a weather forecast server 91 via a communication network 90. The demand forecast data acquirer 12 is connected to a demand forecast management server 92 via the communication network. The weather forecast data acquirer 11, the demand forecast data acquirer 12, an operation data acquirer 13 and the operation plan creator 14 can be implemented by one or more circuitry. For example, the operation plan creator 14 and the operation data acquirer 13 can be implemented by processing circuitry. At least one of the weather forecast data acquirer 11, the demand forecast data acquirer 12, an operation data acquirer 13 can be implemented by acquisition circuitry.

The weather forecast data acquirer 11 communicates with the weather forecast server 91 via the communication network 90 and acquires weather forecast data from the weather forecast server 91. The weather forecast data is an example of data related to an environmental condition of the power generation device such as the photovoltaic power generation device 500. The data related to the environmental condition is not limited, but may be, for example, past performance data or statistical data or may be data assumed for simulation.

The demand forecast data acquirer 12 communicates with the demand forecast management server 92 via the communication network 90 and acquires demand forecast data from the demand forecast management server 92. The demand forecast data includes demand forecast in a latest short period (target period). The demand forecast data includes demand forecast data (first demand data) of hydrogen to be supplied to an external device (FCV in this example) in a target period. Furthermore, the demand forecast may also include power demand forecast data (second demand data) of the power consumption device (power consumer 300, load device 900 or the like) for the target period. The hydrogen demand forecast data is an example of first demand data related to a demand amount necessary for the external device for the first period. The first demand data may be, for example, past performance data or statistical data or data forecast from past performance data or statistical data, or may be other data as long as it represents a demand amount. The power demand forecast data is an example of second demand data related to power consumed during the first period. The second demand data may be, for example, past performance data or statistical data or data forecast from past performance data or statistical data or may be other data as long as it represents power consumed.

The operation data acquirer 13 acquires operation data (system operation data) of the energy system 200. More specifically, the operation data acquirer 13 communicates with each device making up the energy system 200 and acquires operation data from each device.

The operation plan creator 14 creates an operation plan using weather forecast data, demand forecast data and operation data. The period covered by the weather forecast data (forecast period) may be the same as a short period (target period) covered by the demand forecast data or further include at least one of a period before the target period or a period after the target period. The operation data may be, for example, operation data acquired when performing operation plan creation processing or a history of operation data acquired before performing the processing.

The operation plan data storage 15 internally stores data of an operation plan created by the operation plan creator 14.

The control device 400 acquires operation data from the operation data acquirer 13 and reads the data of the operation plan from the operation plan data storage 15. The operation command value generation device 410 identifies a device to be controlled based on the operation data and the operation plan and generates control information to control the device to be controlled as an operation command value. The device to be controlled includes at least one of the hydrogen manufacturing device 102, the fuel cell 104 and the storage battery 101. The operation command value transmitter 420 transmits the generated operation command value to the device to be controlled. The device to be controlled operates according to the received operation command value.

Figure 3:
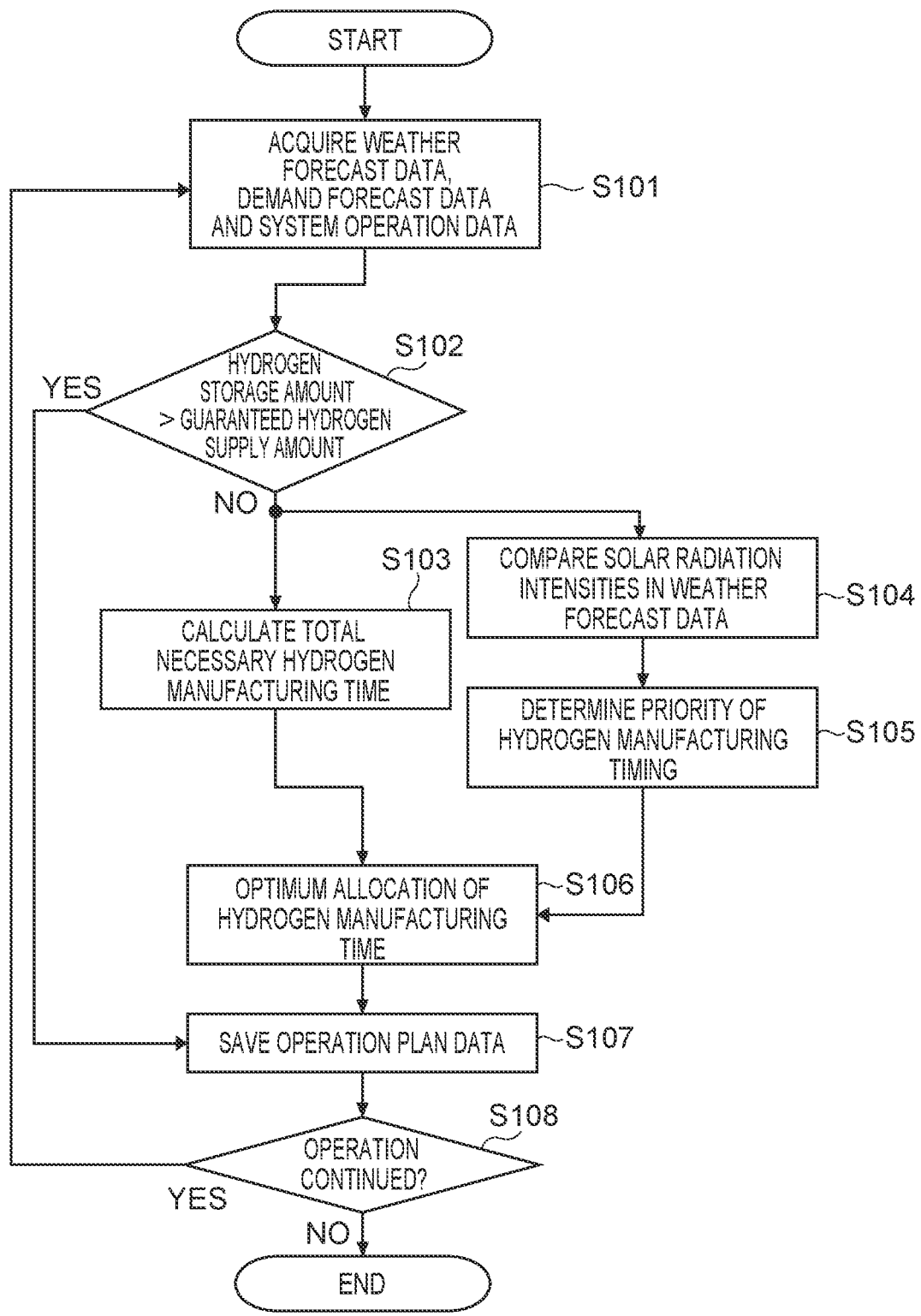
FIG. 3 is a flowchart showing an example of processing by the operation plan creation device according to the first embodiment.

FIG. 3 is a flowchart showing an example of processing by the operation plan creation device 10. The flowchart shows an example in which the present processing acquires hydrogen demand forecast data as demand forecast, and creates a manufacturing plan of hydrogen to be supplied to the external demand device (FCV in this example) or a storage amount plan as an operation plan.

First, the weather forecast data acquirer 11 acquires the weather forecast data, the demand forecast data acquirer 12 acquires the hydrogen demand forecast data and the operation data acquirer 13 acquires the operation data of the energy system 200 (S101).

Next, the operation plan creator 14 checks the current hydrogen storage amount in the hydrogen tank 106 based on the system operation data. The operation plan creator 14 checks a hydrogen supply amount (guaranteed hydrogen supply amount) scheduled to be supplied to the FCV from the hydrogen supply device 105 on a scheduled date of hydrogen supply (first point in time), that is, an amount of hydrogen forecast demand, based on the hydrogen demand forecast data (S102).

When the hydrogen storage amount is less than the guaranteed hydrogen supply amount, that is, when the hydrogen storage amount is insufficient (NO in S102), the operation plan creator 14 calculates total hydrogen manufacturing time necessary to manufacture the hydrogen shortfall using the hydrogen manufacturing device 102 (S103).

On the other hand, the operation plan creator 14 compares daily solar radiation intensities within a forecast period based on the weather forecast data (S104). The forecast period is a certain period of time before timing at which hydrogen is supplied to the FCV (scheduled date of hydrogen supply). The operation plan creator 14 determines priority of hydrogen manufacturing dates based on daily solar irradiance (S105). For example, the operation plan creator 14 determines dates on which hydrogen is manufactured in descending order of solar irradiance.

The operation plan creator 14 creates a hydrogen manufacturing plan according to which the total hydrogen manufacturing time is allocated to one or more days based on the total hydrogen manufacturing time calculated in step S103 and the priority of hydrogen manufacturing dates determined in step S105 (S106). Regarding the allocation, hydrogen manufacturing time is preferentially allocated, for example, to days with high solar irradiance until the total allocated hydrogen manufacturing time reaches the total hydrogen manufacturing time. Note that a time zone in which the forecast value of solar irradiance of weather forecast data has a certain value or more may be determined as a time zone of the day in which hydrogen is manufactured or a predetermined time zone such as 8:00 to 17:00 may be determined as a time zone in which hydrogen is manufactured. In this way, a hydrogen manufacturing period including a date to which the hydrogen manufacturing time is allocated is determined by allocating the hydrogen manufacturing time to each day according to the priority. Note that the hydrogen manufacturing period need not be consecutive days, but may be a plurality of days intermittently arranged.

When the hydrogen storage amount in the hydrogen tank 106 is equal to or more than a guaranteed amount of hydrogen supply, the operation plan creator 14 creates a hydrogen manufacturing plan according to which hydrogen is not manufactured from the present day until the day on which hydrogen is supplied to the FCV, as an operation plan. When the hydrogen storage amount plan is created as an operation plan, the current hydrogen storage amount plan may be used as the operation plan as is (however, until the scheduled date of FCV hydrogen supply, there is no scheduled hydrogen supply from the other hydrogen tank 106).

The operation plan creator 14 determines whether or not to continue operation (S108). For example, when there is still at least one day left until hydrogen is supplied to the FCV, the operation plan creator 14 determines that the operation is continued (YES). In this case, the operation plan creator 14 returns to step S101, acquires new weather forecast data or the like and creates an operation plan. The accuracy of weather forecast also increases as the target date (scheduled date of hydrogen supply) come closer and if contents of the weather forecast data are different from the contents of previously acquired weather forecast data, the priority of hydrogen manufacturing in step S105 may be changed from the previous priority according to the result of comparison of solar irradiance in step S104. When the operation plan creator 14 determines that the operation is not continued (NO), the present processing ends.

Although the guaranteed hydrogen supply amount has been descried above as the hydrogen necessary to be supplied to the FCV, in order to respond to an unexpected hydrogen supply, a predetermined minimum hydrogen supply amount may be determined and the determined value may be used as the guaranteed hydrogen supply amount. In this case, the minimum hydrogen supply amount may be a value greater than a maximum value (upper limit hydrogen amount) of an amount of hydrogen that is possibly supplied to the FCV on the scheduled date of hydrogen supply.

Although the priority of hydrogen manufacturing dates (hydrogen manufacturing timing) has been determined based on only daily solar irradiance of the weather forecast data, if power demand forecast data is used, the priority of hydrogen manufacturing dates may be determined with the daily power demand taken into account. For example, the priority may be determined in order of days arranged in descending order of values obtained by subtracting the daily power demand amount from the amount of power generation calculated from the daily solar irradiance.

Although the operation plan creator 14 acquires and uses both the weather forecast data and demand forecast data in the aforementioned processing, only one of the weather forecast data and demand forecast data may be acquired and used. In this case, for example, when the weather forecast data is acquired and the demand forecast data is not acquired, it is possible to perform processing assuming that a certain demand amount is generated for each period during which the demand amount is fixed or forecast the demand amount from past operation data.

Figure 4:
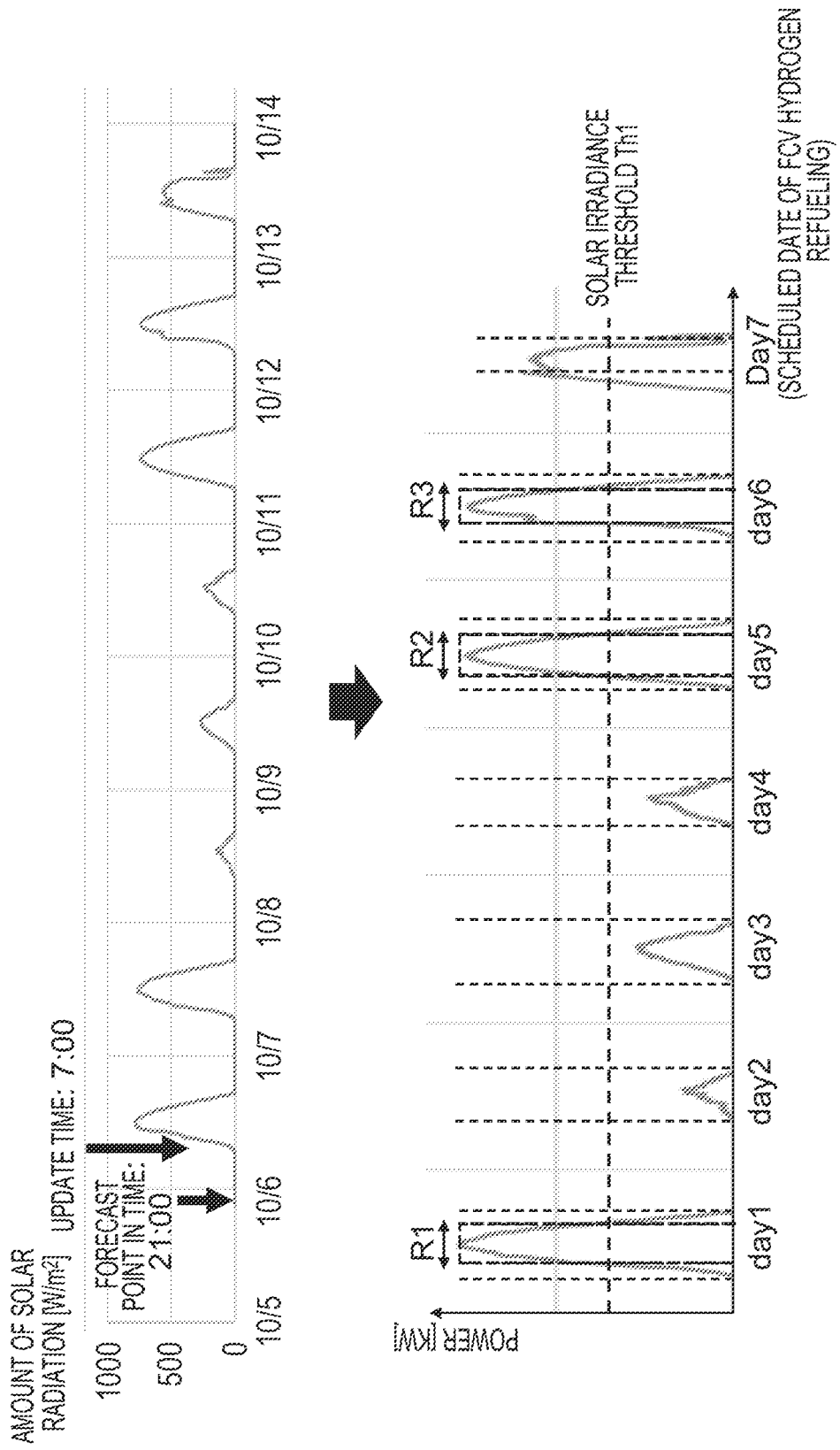
FIG. 4 is a diagram illustrating a specific example of creating a hydrogen manufacturing plan as an operation plan.

FIG. 4 is a diagram illustrating a specific example of creating a hydrogen manufacturing plan as an operation plan according to the operation shown in the flowchart of FIG. 3.

An upper drawing in FIG. 4 shows the weather forecast data acquired from the weather forecast server. The weather forecast server performs weather forecast at 21:00 on October 5 and the weather forecast data is updated at 7:00 on October 6. The weather forecast data acquirer 11 acquires this updated weather forecast data. The upper drawing in FIG. 4 shows the acquired weather forecast data. The weather forecast data includes a distribution of daily solar irradiance from October 6 onward. Although data until October 13 is shown in this example, data from 14 onward may also exist.

A lower drawing in FIG. 4 shows an example of a distribution of power generation amount (PV power generation amount) of the photovoltaic power generation device 500 is calculated from a distribution of daily solar irradiance shown in the weather forecast data for a period (6 days) before the scheduled date of hydrogen supply of the FCV. The scheduled date of hydrogen supply (day 7) corresponds to October 13 of the weather forecast data and 6 days (day 1 to day 6) before the scheduled date of hydrogen supply is the target period of the operation plan. The target period may include the scheduled date of hydrogen supply (day 7). Day 1 to day 6 correspond to October 7 to October 12 of the weather forecast data. Six days (day 1 to day 6) in the target period are candidate dates for hydrogen manufacturing time allocation.

The operation plan creator 14 compares the power generation amounts on day 1 to day 6 and identifies day 1, day 5 and day 6 when the power generation amount is equal to or more than a threshold. A process of allocating the hydrogen manufacturing time to the hydrogen manufacturing device 102 in ascending order of the identified days is performed until the allocated hydrogen manufacturing time reaches the total hydrogen manufacturing time. The hydrogen manufacturing time for one day is assumed to be time zones R1, R2 and R3 in which solar irradiance (or power generation) exceeds a threshold Th1.

Figure 4A:
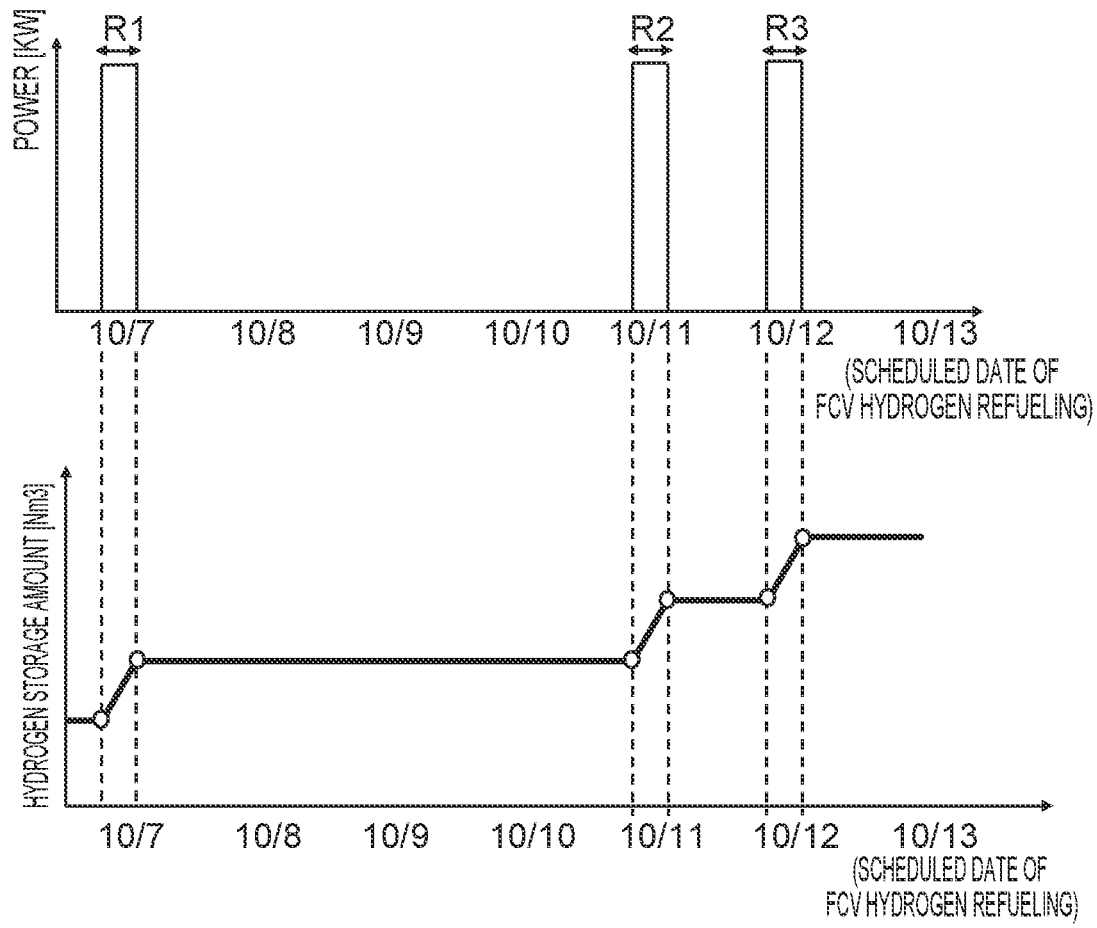
FIG. 4A is a diagram illustrating an example of the hydrogen manufacturing plan and an example of a hydrogen storage amount plan.

An upper drawing in FIG. 4A shows an example of the created hydrogen manufacturing plan. Hydrogen manufacturing times are allocated to time R1 on October 7, time R2 on October 11 and time R3 on October 12, respectively.

A lower drawing in FIG. 4A shows an example of the hydrogen storage amount plan based on the created hydrogen manufacturing plan. Since hydrogen is manufactured in three days and stored in the hydrogen tank 106, the hydrogen storage amount increases gradually. However, it is assumed that there are no plans to supply hydrogen from the other hydrogen tank 106 until the scheduled date of FCV hydrogen supply.

In the example in FIG. 4, days on which the amount of daily power generation is equal to or more than a threshold are assumed to be days for hydrogen manufacturing time allocation. However, it is also possible to determine priority of day 1 to day 6 in descending order of the power generation amount regardless of power generation amounts and allocate hydrogen manufacturing times to the hydrogen manufacturing device for each day according to the determined priority.

In the example in FIG. 4, although the time period during which hydrogen manufacturing times are allocated is assumed to be a time zone in which solar irradiance exceeds the threshold Th1, such a time period may be a specific time zone determined in advance or may also be time determined based on other criteria.

In the example in FIG. 4, although day 7, the scheduled date of hydrogen supply, is not included in candidate dates for hydrogen manufacturing time allocation, the scheduled date of hydrogen supply may be included in candidate days for hydrogen manufacturing time allocation.

In the example in FIG. 4, although the hydrogen manufacturing time is determined as a continuous time period in a day, the hydrogen manufacturing time may be divided into two or more time zones of the day. For example, if solar irradiance is expected to decrease due to a poor weather condition, the hydrogen manufacturing time may possibly be divided into two or more time zones.

As described above, according to the present embodiment, it is possible to create an operation plan that enables operation of an efficient energy system by creating a short-term operation plan (hydrogen manufacturing plan or the like) until the scheduled date of hydrogen supply using weather forecast data, short-term demand forecast and operation data.

Second Embodiment

In the first embodiment, a short-term operation plan is created based on weather forecast data and short-term demand forecast. In a second embodiment, a method for creating a short-term operation plan is described by taking into account demand forecast from a long-term perspective such as NetZero as well.

Figure 5:
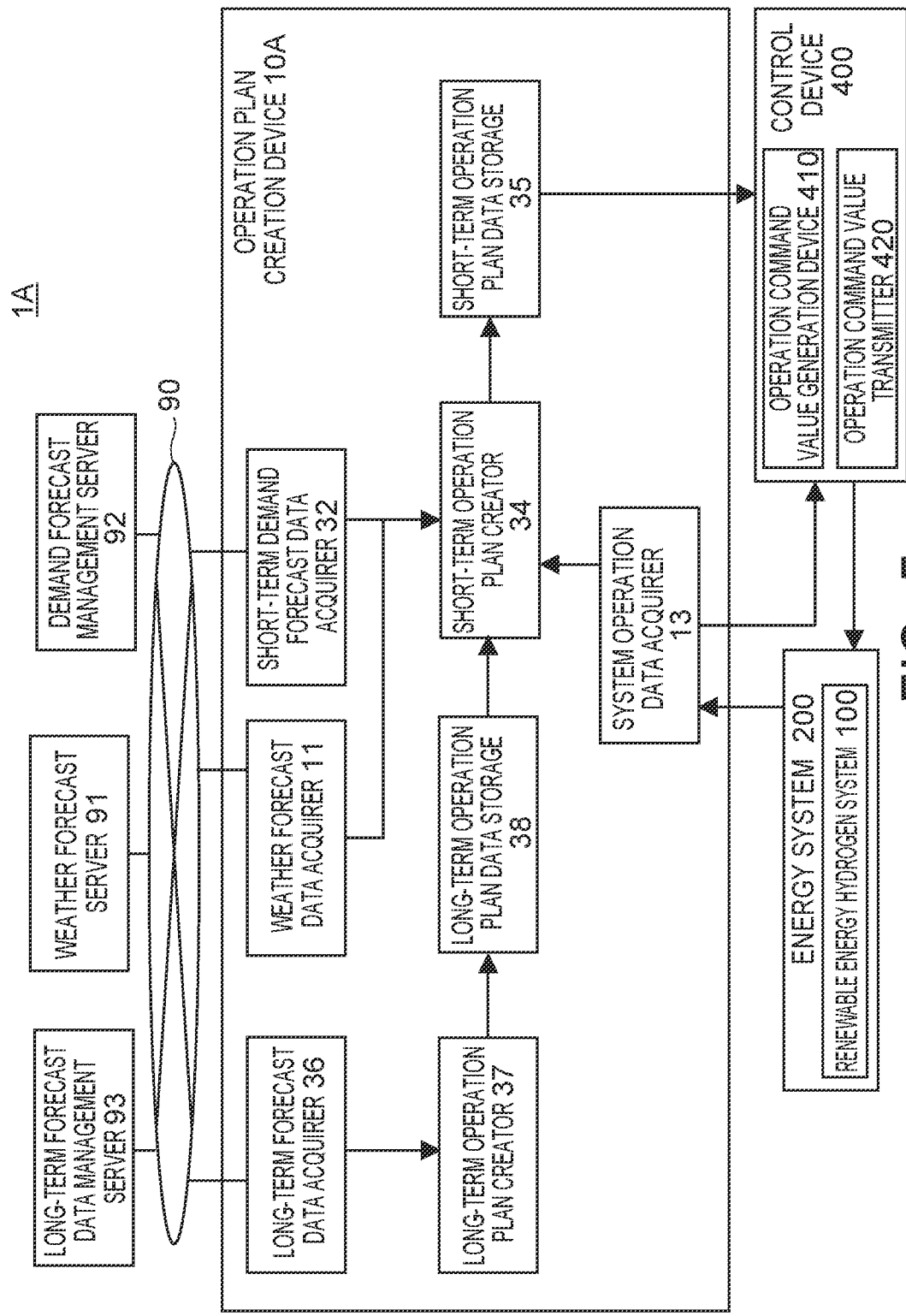
FIG. 5 is a block diagram illustrating an information processing system according to a second embodiment.

FIG. 5 is a block diagram illustrating an information processing system 1A according to the second embodiment. Compared to the first embodiment, functions of an operation plan creation device 10A are extended from the functions of the first embodiment and a long-term forecast data management server 93 is connected to the communication network 90.

The operation plan creation device 10A is provided with the weather forecast data acquirer 11, the operation data acquirer 13, a short-term demand forecast data acquirer 32, a short-term operation plan creator 34, a short-term operation plan data storage 35, a long-term forecast data acquirer 36, a long-term operation plan creator 37 and a long-term operation plan data storage 38.

The weather forecast data acquirer 11 and the operation data acquirer 13 are the same as those in FIG. 1. The short-term demand forecast data acquirer 32 and the short-term operation plan data storage 35 have the same functions as those of the demand forecast data acquirer 12 and the operation plan data storage 15 in FIG. 1. Detailed descriptions of the elements 11, 13, 32 and 35 are omitted.

The long-term forecast data acquirer 36 is connected to the long-term forecast data management server 93 via the communication network 90. The long-term forecast data management server 93 manages long-term forecast data related to renewable power (PV power generation in this example), long-term forecast data related to power demand and long-term forecast data related to hydrogen demand. More specifically, the long-term forecast data management server 93 stores and manages long-term PV power generation forecast data and long-term power demand forecast data (fourth demand data), long-term hydrogen demand forecast data (third demand data). The long-term hydrogen demand forecast data is an example of third demand data related to a demand amount necessary for an external device in a second period longer than a first period. As the third demand data, past performance data or statistical data of past performance may be used or may be plan data planned by a user in advance. The long-term power demand forecast data is an example of fourth demand data related to power consumed for the second period longer than the first period. The fourth demand data may be past performance data or statistical data of past performance, or plan data planned by a user in advance.

Figure 6:
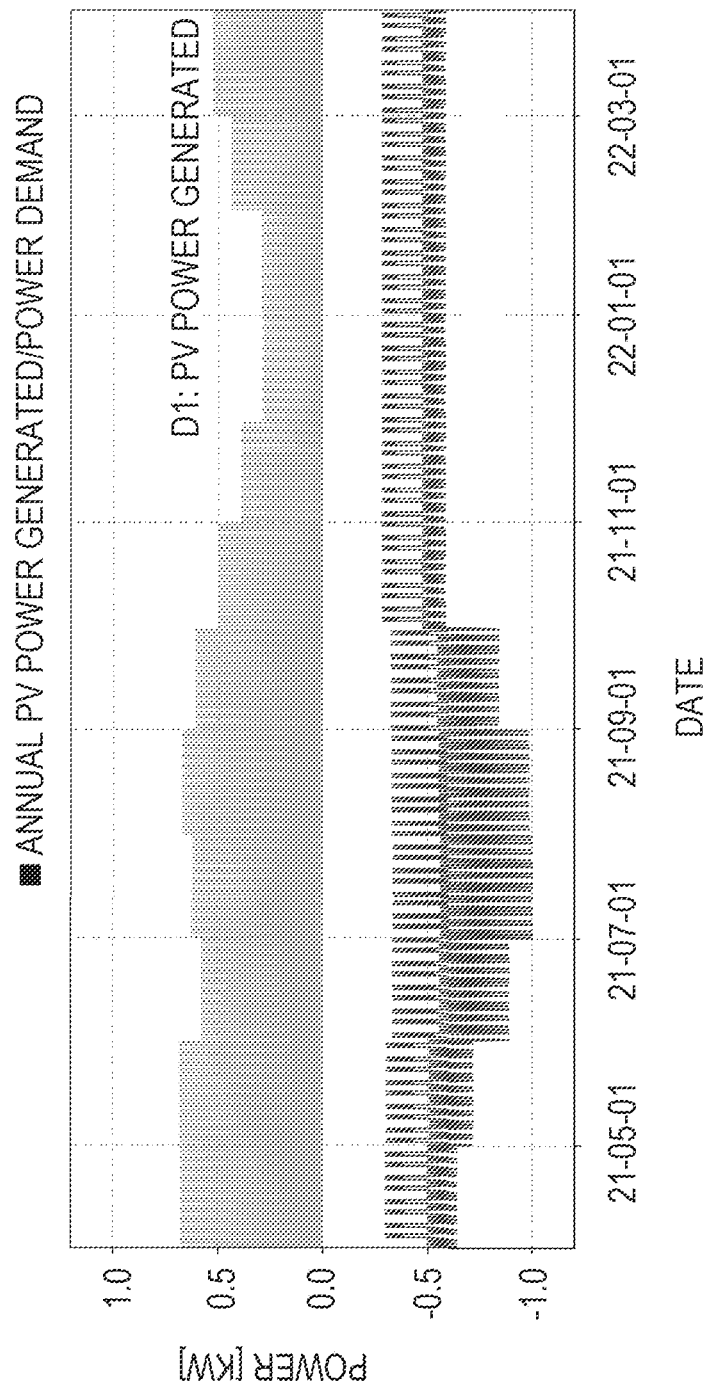
FIG. 6 is a diagram illustrating an example of long-term forecast data.

FIG. 6 shows forecast data D1 of annual PV power generation and forecast data D2 of annual power demand as examples of the long-term forecast data. The horizontal axis represents time and the vertical axis represents power supply-demand. When the sign of power supply-demand is positive, this means power generation and when the sign is negative, this means power consumption. For this reason, the forecast data D1 of PV power generation takes a positive value and the forecast data D2 of power demand takes a negative value.

Figure 7:
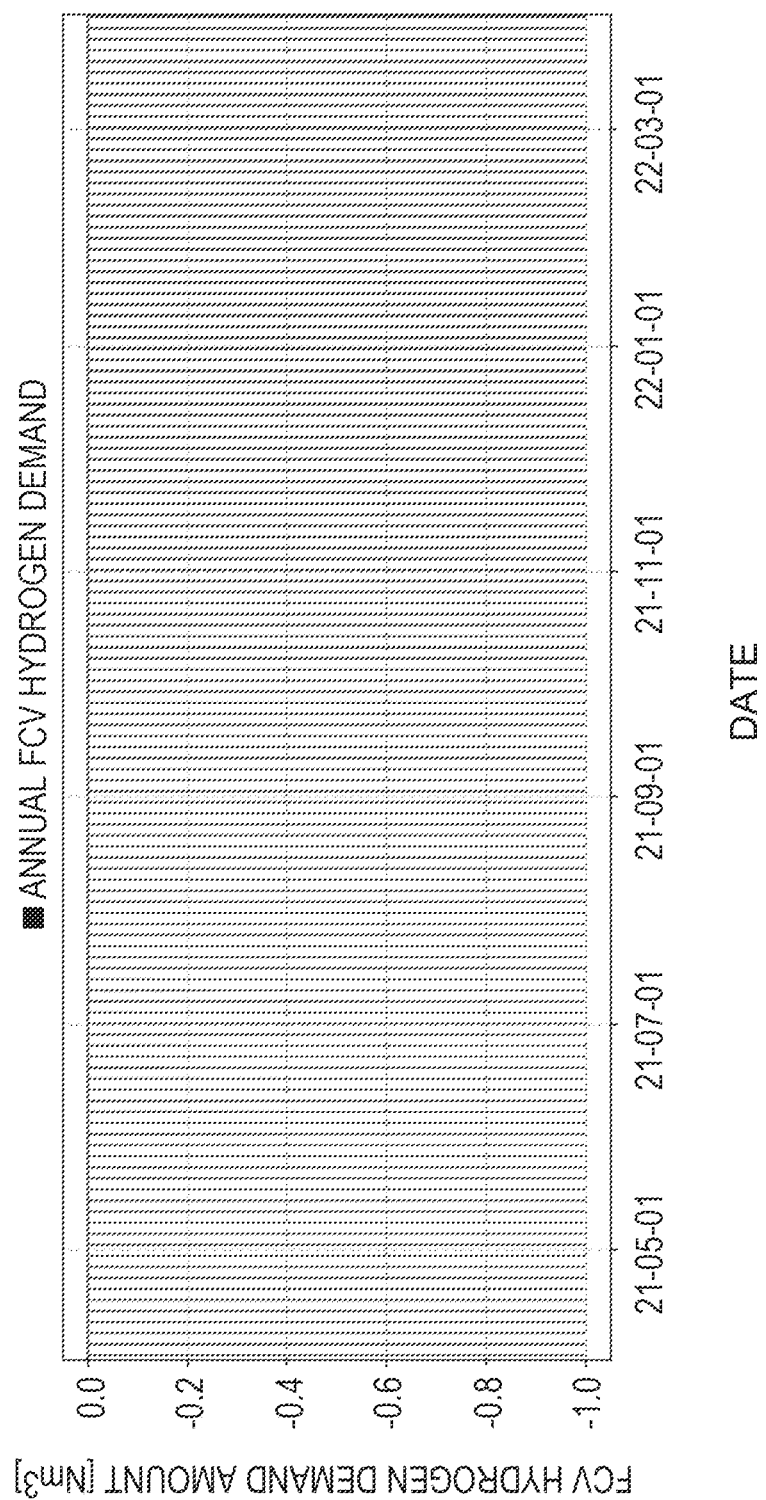
FIG. 7 is a diagram illustrating an example of annual hydrogen demand forecast data as long-term forecast data.

FIG. 7 shows an example of annual hydrogen demand forecast data of the FCV as long-term forecast data. The horizontal axis represents time and the vertical axis represents a hydrogen demand amount (planned amount of hydrogen supply) of the FCV.

The long-term operation plan creator 37 creates a long-term operation plan of the energy system 200 through optimization calculation (e.g., calculation using mixed integer planning) based on the long-term forecast data acquired by the long-term forecast data acquirer 36. The long-term operation plan creator 37 saves the created data of the long-term operation plan in the long-term operation plan data storage 38. Details of the processing of creating a long-term operation plan will be described later.

The long-term operation plan data storage 38 stores the data of the long-term operation plan created by the long-term operation plan creator 37.

Figure 8:
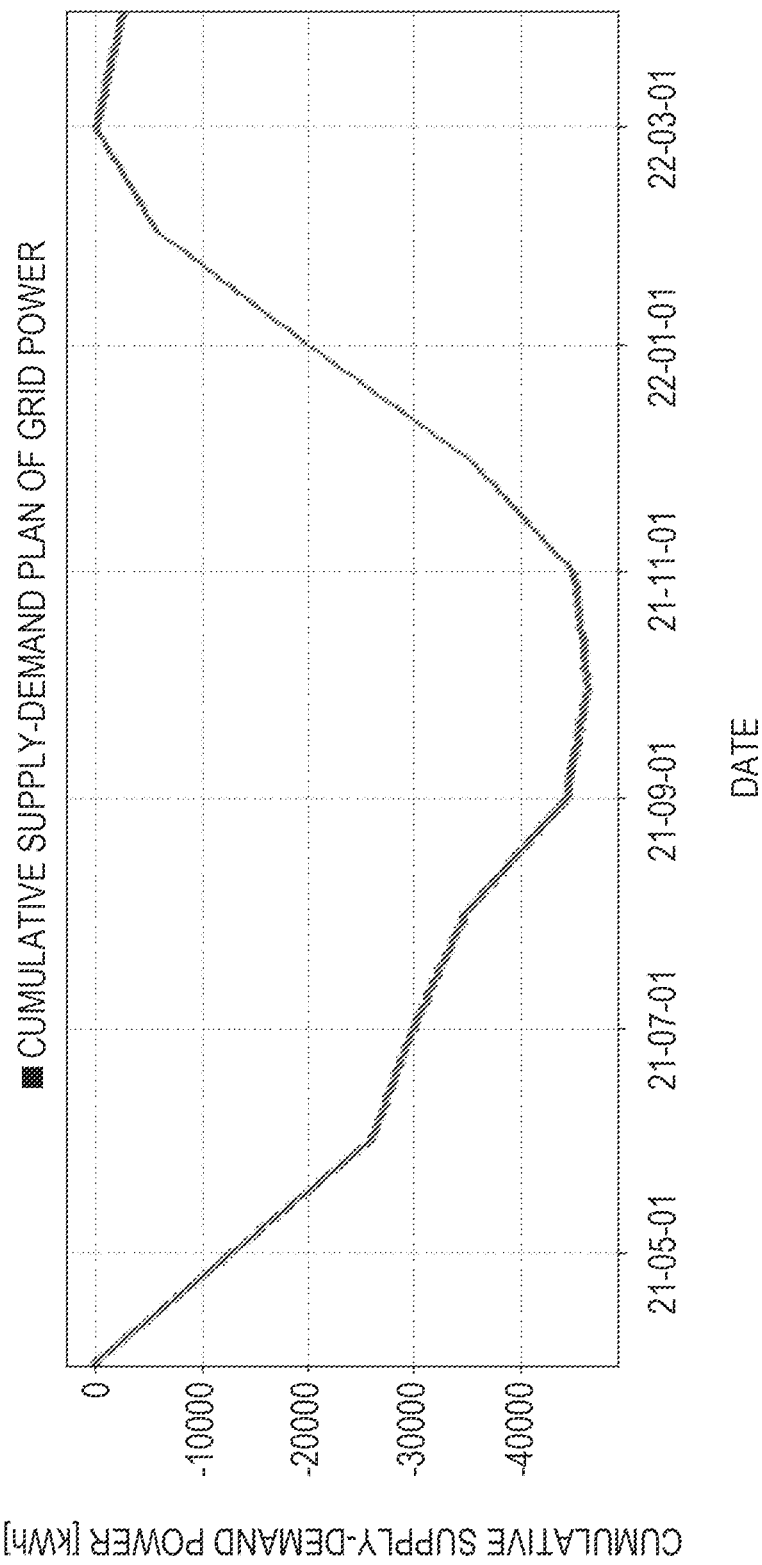
FIG. 8 is a diagram illustrating a cumulative supply-demand plan of grid power created by a long-term operation plan creator.

FIG. 8 shows a cumulative supply-demand plan of grid power (power of the power grid 800) created by the long-term operation plan creator 37 based on the forecast data D1 of the PV power generation and the forecast data D2 of the power demand in FIG. 6.

Figure 9:
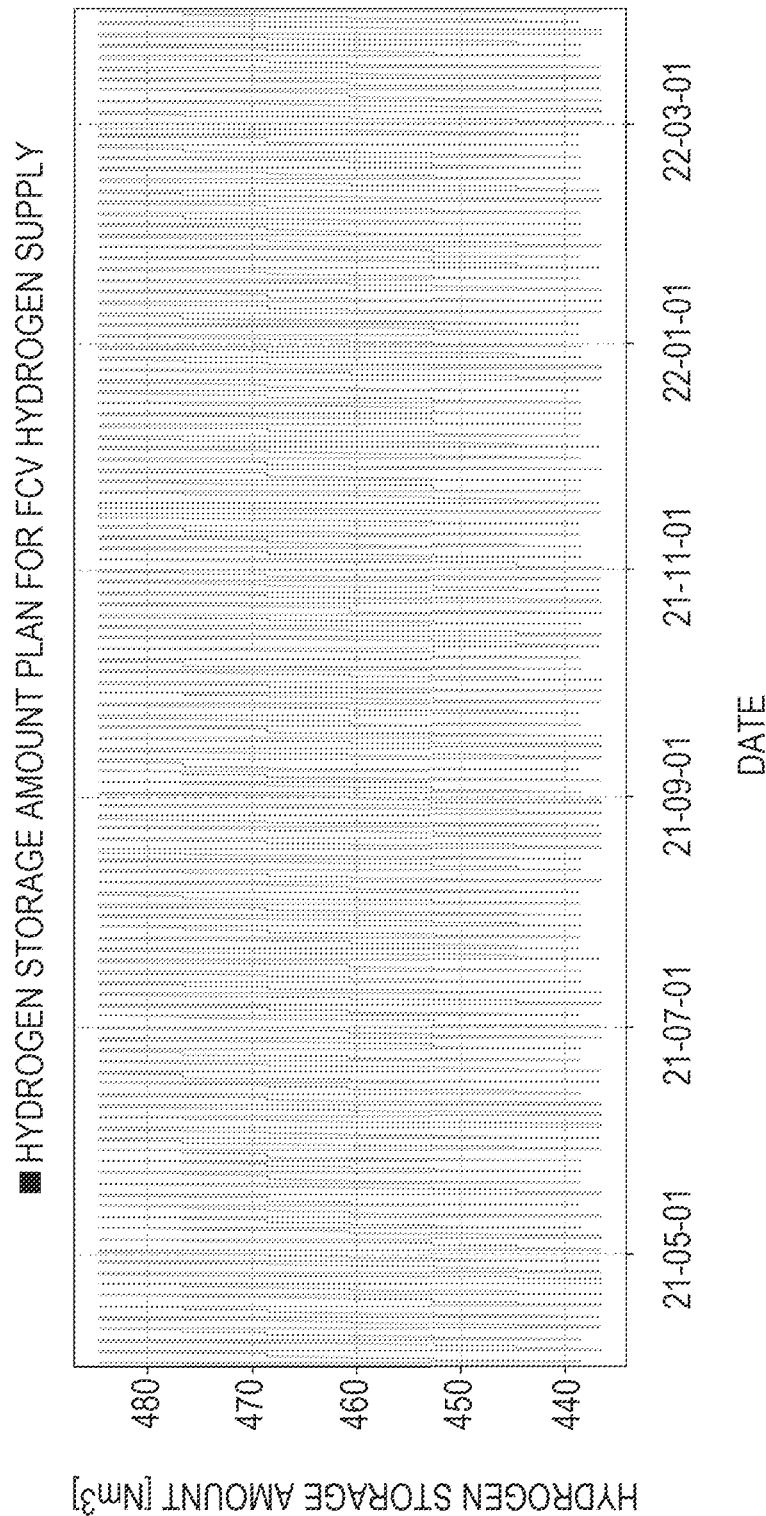
FIG. 9 is a diagram illustrating a hydrogen storage amount plan for FCV hydrogen supply created by the long-term operation plan creator.

FIG. 9 shows a hydrogen storage amount plan for FCV hydrogen supply created by the long-term operation plan creator 37 based on the hydrogen demand forecast data in FIG. 7.

The short-term operation plan creator 34 creates a short-term operation plan by updating a latest short-term period (target period) plan portion of the long-term forecast data using data of the long-term operation plan, weather forecast data acquired by the weather forecast data acquirer 11, latest short-term power demand forecast and latest short-term hydrogen demand forecast acquired by the short-term demand forecast data acquirer 32 and operation data of the energy system 200 acquired by the operation data acquirer 13. The short-term operation plan creator 34 saves the created short-term operation plan in the short-term operation plan data storage 35.

The short-term operation plan data storage 35 stores data of the short-term operation plan created by the short-term operation plan creator 34.

The control device 400 reads the short-term operation plan read from the short-term operation plan data storage 35 and controls the energy system 200 or the renewable energy hydrogen system 100 based on the read short-term operation plan. Since a configuration and operation of the control device 400 are the same as the configuration and operation of the first embodiment, descriptions will be omitted.

Figure 10:
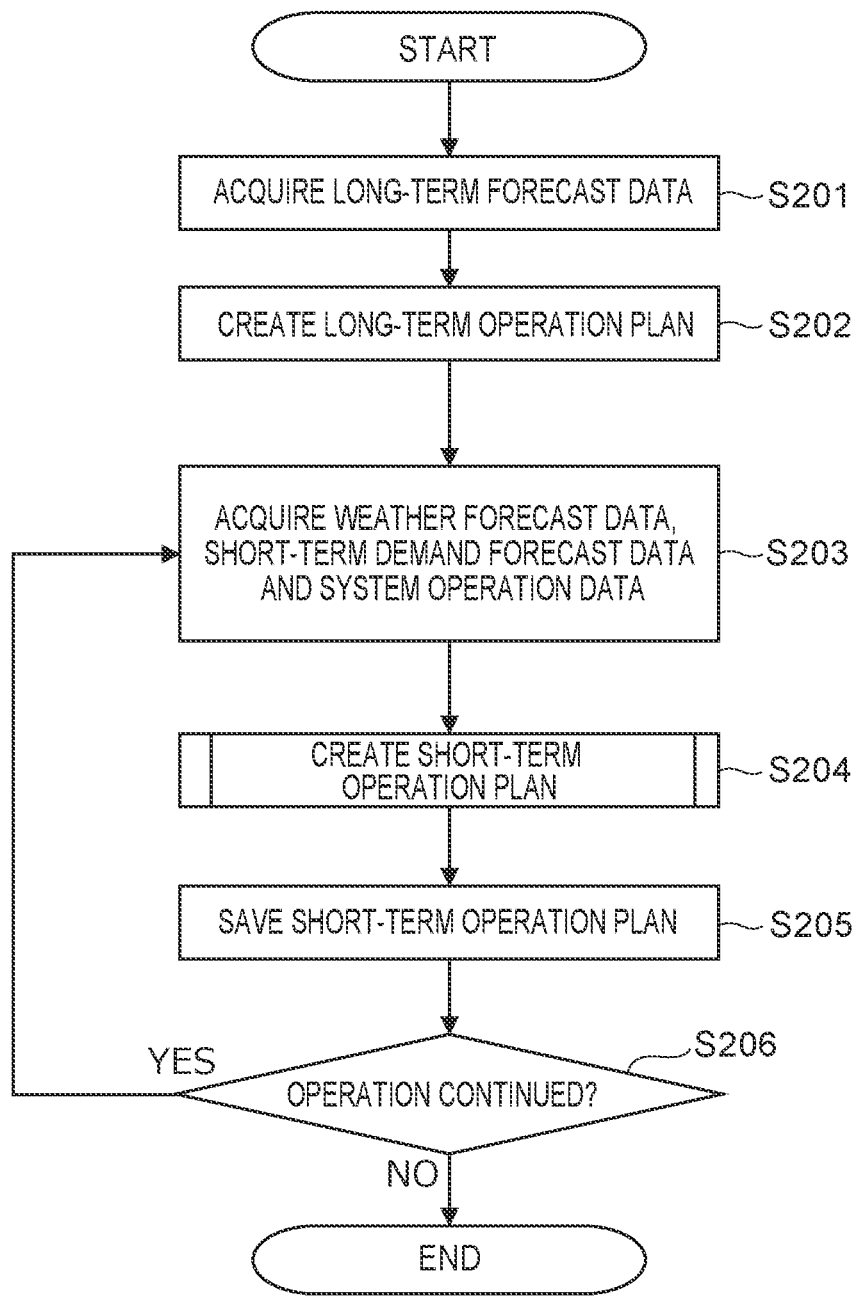
FIG. 10 is a flowchart showing an example of processing by the operation plan creation device according to a second embodiment.

FIG. 10 is a flowchart showing an example of processing by the operation plan creation device 10A.

The long-term forecast data acquirer 36 acquires long-term PV power generation forecast data, long-term power demand forecast data and long-term hydrogen demand forecast data as long-term forecast data from the long-term forecast data management server 93 (S201).

The long-term operation plan creator 37 creates a long-term operation plan using an optimization technique (details will be described later) based on the acquired long-term forecast data (S202). The created long-term operation plan is saved in the long-term operation plan data storage 38. The long-term operation plan includes, for example, a grid power cumulative supply-demand plan and an FCV hydrogen storage amount plan. Once the long-term operation plan is created, the plan is used for a predetermined period. The predetermined period is assumed to be sufficiently longer than the period covered by the short-term operation plan.

The weather forecast data acquirer 11 acquires weather forecast data, the short-term demand forecast data acquirer 32 acquires short-term demand forecast data and the operation data acquirer 13 acquires system operation data (S203).

The short-term operation plan creator 34 updates the planning part of the latest period (target period) covered by the short-term demand forecast of the long-term operation plan using the data acquired in step S203 (S204). The short-term operation plan creator 34 designates the updated plan portion as the operation plan (short-term operation plan) for the latest period. In this way, the short-term operation plan creator 34 creates a short-term operation plan. The created short-term operation plan is saved in the short-term operation plan data storage 35.

The short-term operation plan creator 34 determines whether or not to continue the operation (S206). This determination method may be similar to that in step S108 of FIG. 3 according to the first embodiment. When the operation is continued (YES), the short-term operation plan creator 34 returns to step S203. When the operation is not continued (NO), the present processing ends.

Figure 11:
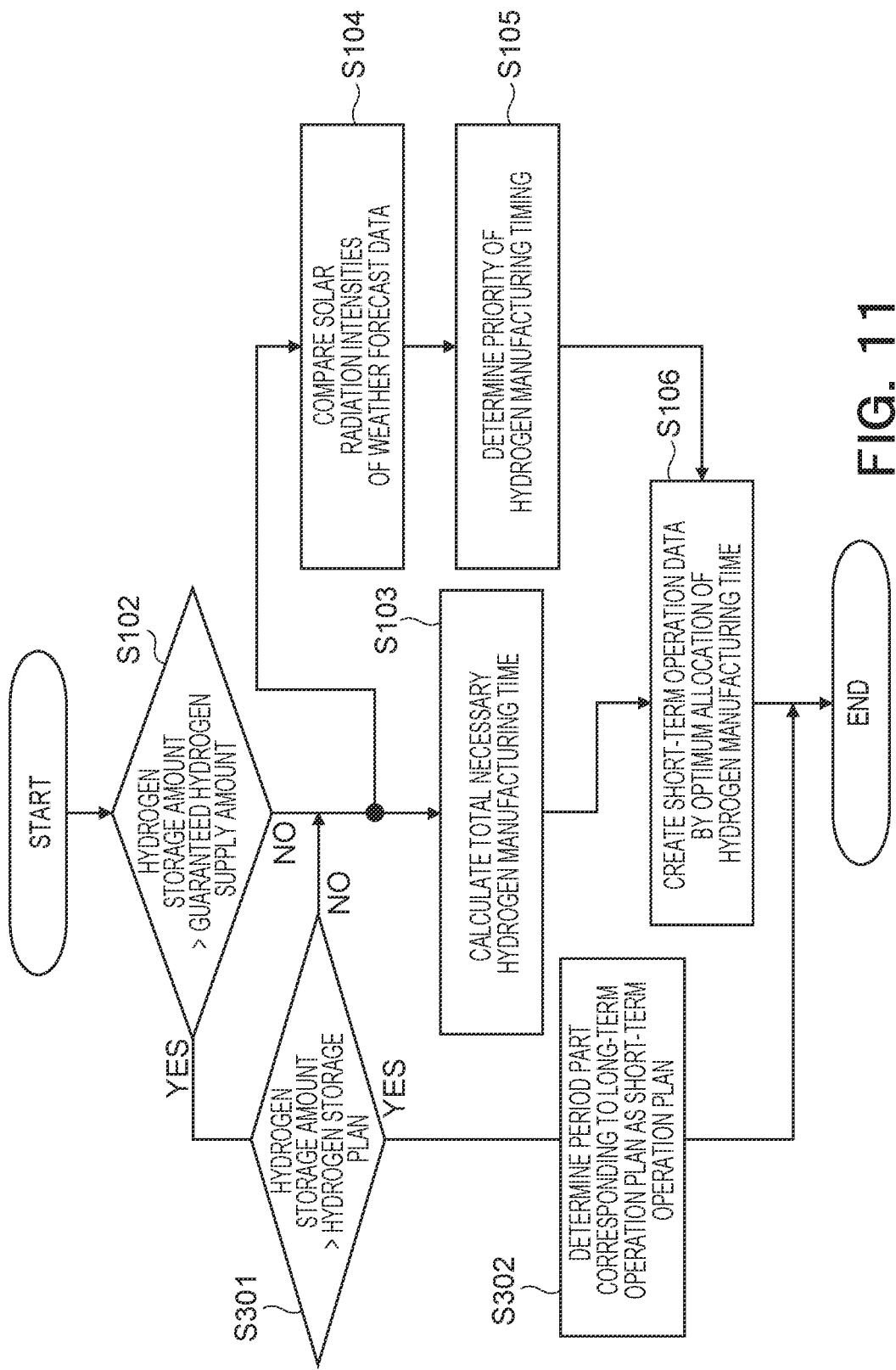
FIG. 11 is a flowchart showing the detailed process in step S204 of FIG. 10.

FIG. 11 is a flowchart showing detailed processing of creating a short-term operation plan carried out in step S204 of FIG. 10. Step S301 is added to the flowchart in FIG. 3 according to the first embodiment. Note that aforementioned step S203 in FIG. 10 corresponds to step S101 in FIG. 3 and steps S205 and S206 in FIG. 10 correspond to steps S107 and S108 in FIG. 3. There are no steps in FIG. 11 that correspond to steps S101, S107 and S108 in FIG. 3.

Next, the short-term operation plan creator 34 checks the current hydrogen storage amount in the hydrogen tank 106 based on the system operation data. Furthermore, the short-term operation plan creator 34 checks a hydrogen supply amount (guaranteed hydrogen supply amount), that is, a forecast value of hydrogen demand forecast data (first demand value), that should be supplied from the hydrogen supply device 105 to the FCV on the scheduled date of hydrogen supply to the FCV based on the hydrogen demand forecast (S102).

When the hydrogen storage amount is less than the guaranteed hydrogen supply amount, that is, when the hydrogen storage amount is insufficient (NO in S102), the short-term operation plan creator 34 proceeds to steps S103 and S104.

In step S103, the short-term operation plan creator 34 calculates total hydrogen manufacturing time necessary for the hydrogen manufacturing device 102 to manufacture the hydrogen shortfall.

In step S104, the short-term operation plan creator 34 compares solar radiation intensities on a plurality of days during a target period based on weather forecast data. The operation plan creator 14 determines priority of hydrogen manufacturing dates in descending order of daily solar radiation intensities based on daily solar radiation intensities as in the case of the first embodiment (S105).

The operation plan creator 14 creates a hydrogen storage amount plan with the total hydrogen manufacturing time distributed to one or more days as in the case of the first embodiment based on the total hydrogen manufacturing time calculated in step S103 and the priority of hydrogen manufacturing dates determined in step S105.

On the other hand, in step S102 when the hydrogen storage amount is equal to or more than the guaranteed hydrogen supply amount, the hydrogen storage amount is compared with the forecast value (second demand value) of storage amount in the hydrogen storage amount plan in the long-term operation plan (S301).

When the hydrogen storage amount is greater than the storage amount forecast value (YES), that is, when the hydrogen storage amount satisfies the hydrogen storage amount plan, the plan portion of the target period (period until the scheduled date of hydrogen supply to the FCV in this example) in the long-term plan regarding the hydrogen storage amount plan is not updated. The plan portion of the target period in the long-term hydrogen storage amount plan is designated as the short-term storage amount plan (operation plan) related to hydrogen storage as is (S302).

Hereinafter, the processing whereby the long-term operation plan creator 37 creates a long-term operation plan will be described in detail. As the technique of creating a long-term operation plan, a technique using mixed integer planning will be described.

As input information, long-term forecast data as shown in FIG. 6 and FIG. 7, that is, PV power generation forecast data, power demand forecast data or FCV hydrogen demand forecast data is used. In terms of time length, the long-term forecast data is hourly annual data.

In the present example, an optimization problem for NetZero objective will be formularized. "NetZero" means that a value obtained by subtracting outflow power (selling electricity) to the power grid from inflow power (buying electricity) from the power grid is 0. Assuming physical quantities (e.g., power, hydrogen amount) handled by each device of an energy system as variables, an objective function including a term of calculating cumulative power inputted/outputted to/from the power grid using the variables is defined. Furthermore, a constraint equation corresponding to each device is defined using a variable. The values of variables (time series data of variables) are calculated by minimizing or subminimizing the objective function under a condition of each constraint equation. A long-term operation plan is obtained from the time series data of the corresponding variable among the calculated variables. In the present example, although NetZero is assumed to be an objective and a target to be minimized is assumed to be cumulative power inputted/outputted to/from the power grid, minimization of cost or CO2 or the like may be assumed to be an objective as another example. In this case, an objective function corresponding to the objective may be set.

Figure 12:
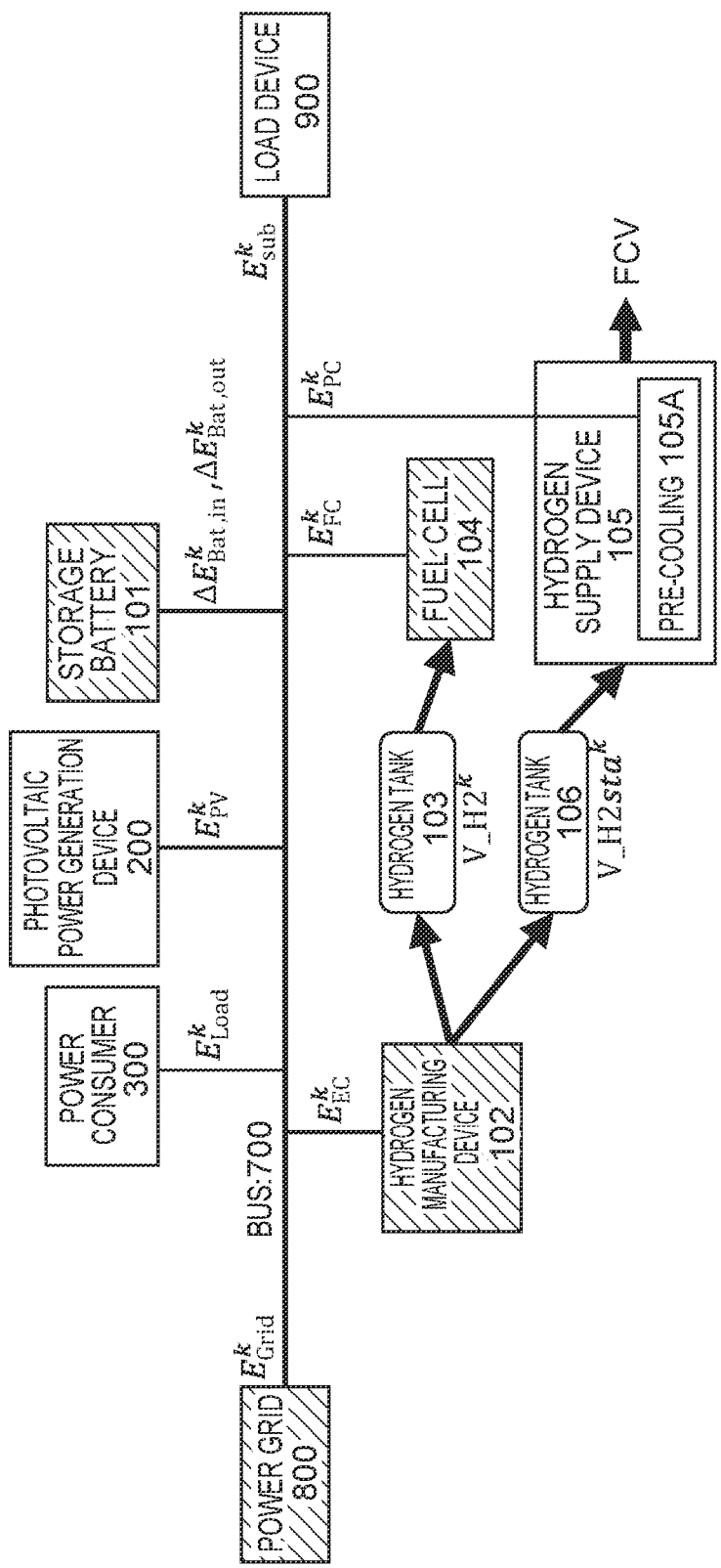
FIG. 12 is a diagram illustrating variables associated with corresponding devices in an energy system.

Definitions of variables, an objective function (equation (1) shown below) and a constraint condition in the present example are shown below. $E_*^k$ ("*" denotes any one or more symbols) among variables included in an objective function (1) denotes 1-hour amount of power. FIG. 12 is shown as supplementary instructions of respective variables.

FIG. 12 shows variables associated with corresponding devices in the energy system. The hydrogen supply device 105 (see FIG. 1) includes a pre-cooling device 105A that performs pre-cooling of hydrogen to be supplied to the FCV, and the present optimization problems take into account a power consumption amount of the pre-cooling device 105A as well.

Definition of Variables $E_{PV}^k$: power generation amount (positive value) of photovoltaic power generation device 500

$E_{Load}^k$: power consumption amount (negative value) of power consumer 300

$\Delta E_{Bat,in}^k$: charging amount (negative value) of storage battery 101

$\Delta E_{Bat,out}^k$: discharging amount (positive value) of storage battery 101

$E_{sub}^k$: power consumption amount (negative value) of load device 900

$E_{EC}^k$: power consumption amount (negative value) of hydrogen manufacturing device 102

$E_{Grid}^k$: power inputted/outputted to/from power grid 800 (power has a positive value in the case of buying electricity (when power is inputted from the power grid 800 to the bus 700) and power has a negative value in the case of selling electricity (when power is outputted from the bus 700 to the power grid 800))

$E_{FC}^k$: power generation amount (positive value) of fuel cell 104

$E_{PC}^k$: power consumption amount (negative value) of pre-cooling

"k" included in each variable denotes time.

$E_{PV}^k$, $E_{Load}^k$, $E_{sub}^k$, $E_{PC}^k$ among the plurality of above-described variables are known variables given in advance as the aforementioned input information. More specifically, $E_{PV}^k$ is given from PV power generation forecast data, $E_{Load}^k$, $E_{sub}^k$ are given from power demand forecast data, and $E_{PC}^k$ is given from hydrogen demand forecast data of FCV (since power consumption amount of pre-cooling is dependent on pre-cooled hydrogen amount, it can be calculated from hydrogen demand amount). Remaining variables other than $E_{PV}^k$, $E_{Load}^k$, $E_{sub}^k$, $E_{PC}^k$ are unknown variables.

(Objective Function)

[Formula 1]

$$E_{Grid} = \Sigma_{k=0}^{K}(E_{PV}^k + \Delta E_{Bat,in}^k + \Delta E_{Bat,out}^k + E_{EC}^k + E_{FC}^k + E_{Sub}^k + E_{Load}^k + E_{PC}^k)*\Delta T \quad (1)$$

(Constraint Conditions of Storage Battery 101)

A constraint equation that charge/discharge power shall be within a rated value and a constraint equation that the charging amount shall be within a capacity are set in the storage battery 101. Note that "SOC" (state of charge) is an index representing power charged in the storage battery and expressed by a ratio of power charged to the rated charging capacity.

Charging power constraint equation: $\Delta E_{RatedCharge} \leq \Delta E_{Bat,in}^k \leq 0$ Discharging power constraint equation: $0 \leq \Delta E_{Bat,out}^k \leq \Delta E_{RatedDischarge}$ Storage battery charging amount at time k: $E_{Bat}^k = E_{Bat,start} - \Sigma_{j=0}^{k}(\Delta E_{Bat,in}^j + \Delta E_{Bat,out}^j)*\Delta T$ Charging amount constraint equation: $E_{RatedCapacity}*SOC_{Lower} \leq E_{Bat}^k \leq E_{RatedCapacity}*SOC_{Upper}$ $\Delta E_{RatedCharge}$: rated charging power $\Delta E_{RatedDischarge}$: rated discharging power $E_{RatedCapacity}$: rated charging capacity $SOC_{Upper}$: SOC upper limit value $SOC_{Lower}$: SOC lower limit value $E_{Bat,start}$: initial storage battery charging amount (Constraint Conditions of Hydrogen Manufacturing Device 102)

For the hydrogen manufacturing device 102, discrete constraint equations that there are two-stage operations of operation and stop: rated power is consumed during operation and power consumption is set to a zero value during stop are set.

Power consumption: $E_{EC}^k = (y_1^k + s_1^k) * E_{EC\_Rated}$
Hydrogen manufacturing amount:

$$\frac{E_{EC}^k}{\eta_{EC}} = (y_1^k + s_1^k) * \frac{E_{EC\_Rated}}{\eta_{EC}}$$

Constraint equation for selection of hydrogen storage destination: $0 \leq y_1^k + s_1^k \leq 1$ (this constraint means that the supply destination of manufactured hydrogen is any one of FCV hydrogen tank 106, FC hydrogen tank 103.)

$y_1^k$: binary variable indicating whether or not to select FC hydrogen tank 103 (set "1" when selected or set "0" when not selected)

$s_1^k$: binary variable indicating whether or not to select FCV hydrogen tank 106 (set "1" when selected or set "0" when not selected)

$E_{EC\_Rated}$: rated power of hydrogen manufacturing device $\eta_{EC}$: conversion efficiency (unit kWh/Nm³) of hydrogen manufacturing device (Constraint Conditions of Hydrogen Storage Amount)

The hydrogen storage device includes a hydrogen tank 103 that stores hydrogen to be supplied to a fuel cell (FC) 104 and a hydrogen tank 106 that stores hydrogen to be supplied to the FCV. Constraint equations that the storage amounts of the hydrogen tanks 103 and 106 shall be within the capacities are set. A constraint that hydrogen manufactured by the hydrogen manufacturing device 102 shall be selectively stored in any one of the hydrogen tanks at time k is also set together.

Hydrogen storage amount of FC hydrogen tank:

$$V\_H2^k = V\_H2^{k-1} - \left(s_1^k * \frac{E_{EC\_Rated}}{\eta_{EC}}\right) - \frac{E_{FC}^k}{\eta_{FC}}$$

Hydrogen storage amount of FCV hydrogen tank:

$$V\_H2sta^k = V\_H2sta^{k-1} - \left(s_1^k * \frac{E_{EC\_Rated}}{\eta_{EC}}\right) + H\_Demand^k$$

FC hydrogen tank constraint: $V_{H2_{min}} \leq V_{H2}^k \leq V_{H2_{max}}$
FCV hydrogen tank constraint: $V\_H2sta_{min} \leq V\_H2sta^k \leq V\_H2sta_{max}$ $E_{EC\_Rated}$: EC rated power
$\eta_{EC}$: EC conversion efficiency (unit kWh/Nm³)
$\eta_{FC}$: FC conversion efficiency (unit kWh/Nm³)

(Constraint Conditions of Fuel Cell)

For the fuel cell, a constraint equation that power generation shall be within the rated value is set. Since the constraint equations can be created as in the case of the storage battery, detailed descriptions of equations are omitted.

Values of unknown variables among the variables included in the objective function (1) are obtained by minimizing or subminimizing the objective function under the aforementioned constraint condition. A long-term operation plan can be acquired from time series data of the obtained values of the variables. For example, a hydrogen storage amount plan for FCV hydrogen supply as shown in FIG. 8 can be acquired from the time series data of $V\_H2sta^k$. A cumulative supply-demand plan as shown in FIG. 9 can be acquired from the time series data of $E_{Grid}$ corresponding to the objective variable.

In the present embodiment, the short-term operation plan creator 34 can perform processing similar to the processing by the operation plan creator 14 according to the first embodiment using neither the long-term forecast data nor the long-term operation plan but using the weather forecast data and the short-term demand forecast. In this case, the short-term operation plan creator 34 may perform operation similar to the operation in the flowchart in FIG. 3 according to the first embodiment.

As described above, according to the present embodiment, it is possible to satisfy the long-term operation plan beyond the weather forecast period and create an optimum short-term operation plan for latest short-term demand forecast. By controlling the renewable energy hydrogen system 100 based on the optimum short-term operation plan created, it is possible to operate each device in the optimum renewable energy hydrogen system 100 with a long-term perspective such as NetZero taken into account as well.

Third Embodiment

Figure 13:
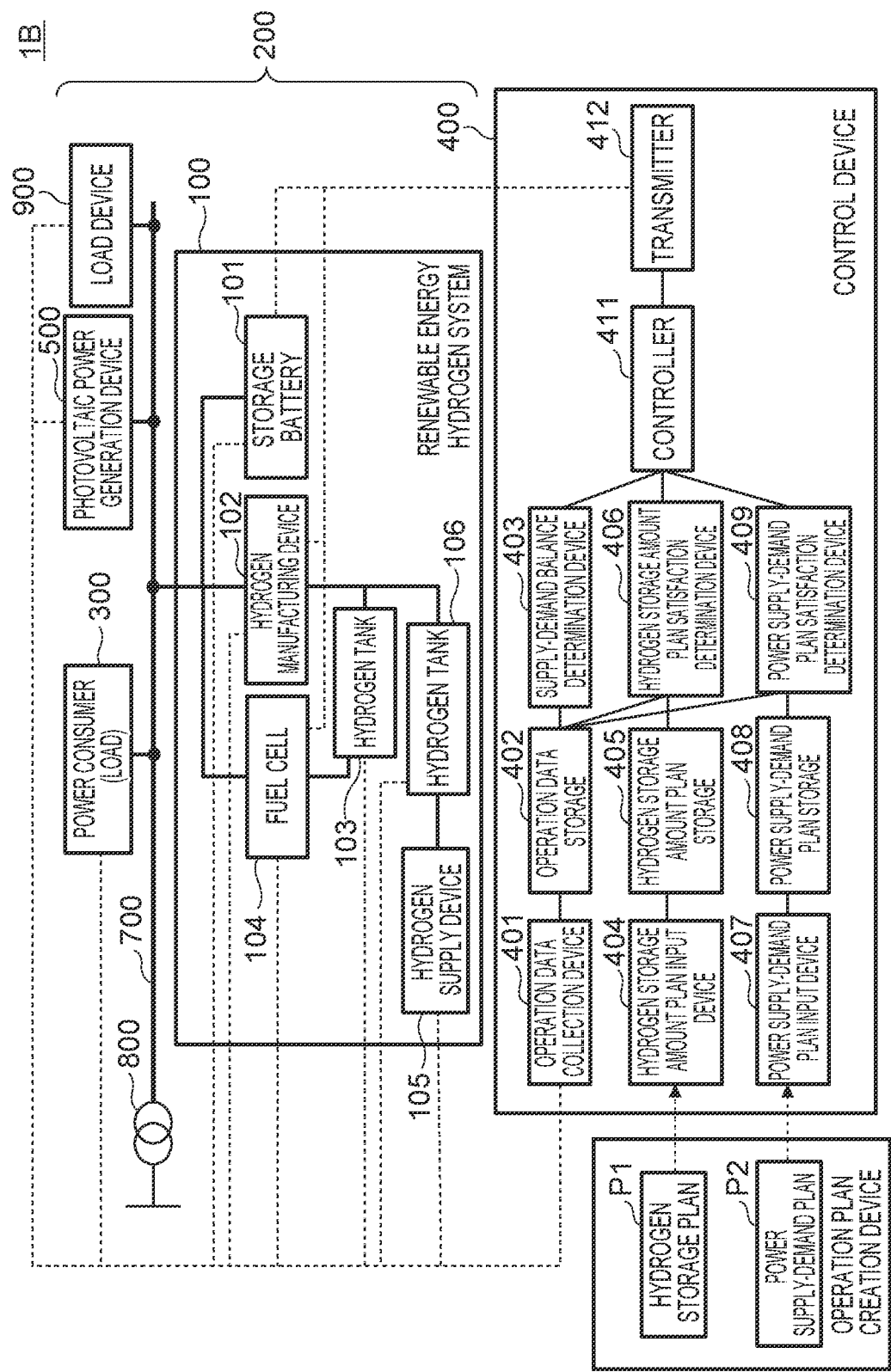
FIG. 13 is a block diagram illustrating an example of an information processing system according to a third embodiment.

FIG. 13 is a block diagram illustrating an example of an information processing system 1B according to a third embodiment. Functions of a control device 400 are extended or changed from the control device 400 of the first embodiment or the second embodiment (see FIG. 1, FIG. 5). The control device 400 acquires a hydrogen storage amount plan P1 and a power supply-demand plan P2 as short-term operation plans created by an operation plan creation device 10B. The operation plan creation device 10B is either the operation plan creation device 10 according to the first embodiment or the operation plan creation device 10A according to the second embodiment. The control device 400 controls the renewable energy hydrogen system or the energy system based on the hydrogen storage amount plan P1 and the power supply-demand plan P2.

The control device 400 is provided with an operation data collection device 401, an operation data storage 402, a supply-demand balance determination device 403, a hydrogen storage amount plan input device 404, a hydrogen storage amount plan storage 405, a hydrogen storage amount plan satisfaction determination device 406, a power supply-demand plan input device 407, a power supply-demand plan storage 408, a power supply-demand plan satisfaction determination device 409, a controller 411 and a transmitter 412.

The operation data collection device 401 acquires operation data of the energy system 200. The operation data of the energy system 200 includes some or all of operation data of the storage battery 101, operation data of the hydrogen manufacturing device 102, operation data of the fuel cell 104, operation data of the hydrogen tank 103, operation data of the hydrogen tank 106, operation data of the hydrogen supply device 105, operation data of the photovoltaic power generation device 500, operation data of the power consumer 300, operation data of the load device 900, and operation data of the power grid 800. The operation data may be acquired at regular intervals or may be acquired by the operation data collection device 401 sending a request for acquiring operation data to the energy system 200.

The operation data storage 402 internally stores the operation data acquired by the operation data collection device 401.

Regarding the time to be determined, the supply-demand balance determination device 403 compares power generation of the photovoltaic power generation device 500 with power consumption of the power consumption device such as the power consumer 300 and the load device 900, and determines whether power generation is equal to or more than the power consumption. That is, the supply-demand balance determination device 403 determines whether the value obtained by subtracting power consumption from power generation is equal to or more than 0. The time to be determined may be current time (e.g., latest time at regular intervals) or may be past or future time. The supply-demand balance determination device 403 provides the determination result to the controller 411.

The hydrogen storage amount plan input device 404 receives the hydrogen storage amount plan P1 from the operation plan creation device 10B and saves the hydrogen storage amount plan P1 in the hydrogen storage amount plan storage 405. The hydrogen storage amount plan storage 405 internally stores the hydrogen storage amount plan P1.

Regarding the time to be determined, the hydrogen storage amount plan satisfaction determination device 406 determines whether or not the hydrogen storage amount of the hydrogen tank 106 satisfies the hydrogen storage amount plan P1. The hydrogen storage amount plan satisfaction determination device 406 determines whether the hydrogen storage amount of the hydrogen tank 103 at the time for determination is equal to or more than a forecast value (threshold) at the time for determination of the hydrogen storage amount plan P1. When the hydrogen storage amount is equal to or more than the forecast value, the hydrogen storage amount plan satisfaction determination device 406 determines that the hydrogen storage amount of the hydrogen tank 103 satisfies the hydrogen storage amount plan P1 and when the hydrogen storage amount is less than the forecast value, it determines that the hydrogen storage amount of the hydrogen tank 103 does not satisfy the hydrogen storage amount plan P1. The hydrogen storage amount plan satisfaction determination device 406 provides the determination result to the controller 411.

The power supply-demand plan input device 407 receives the power supply-demand plan P2 from the operation plan creation device 10B and saves the power supply-demand plan P2 in the power supply-demand plan storage 408. The power supply-demand plan storage 408 internally stores the power supply-demand plan P2.

Regarding the time to be determined, the power supply-demand plan satisfaction determination device 409 determines whether or not the cumulative amount of power transmitted/received to/from the power grid 800 satisfies the power supply-demand plan P2. The power supply-demand plan satisfaction determination device 409 determines whether the cumulative power at the time for determination is equal to or more than the forecast value (threshold) at the time for determination of the power supply-demand plan P2. When the cumulative power is equal to or less than the forecast value, the power supply-demand plan satisfaction determination device 409 determines that the cumulative power satisfies the power supply-demand plan P2, and when the cumulative power exceeds the forecast value, it determines that the cumulative power does not satisfy the power supply-demand plan P2. The power supply-demand plan satisfaction determination device 409 provides the determination result to the controller 411.

The controller 411 acquires information indicating the determination result from the supply-demand balance determination device 403, the hydrogen storage amount plan satisfaction determination device 406 and the power supply-demand plan satisfaction determination device 409, and generates control information of the renewable energy hydrogen system 100 or control information of the energy system 200 based on the acquired information. For example, the controller 411 determines which processing is executed: power generation of the fuel cell 104, manufacturing of hydrogen to be stored in the hydrogen tank 106, manufacturing of hydrogen to be stored in the hydrogen tank 103, charge of the storage battery 101, discharge of the storage battery 101, selling electricity to the power grid 800 or buying electricity from the power grid 800. For example, when the hydrogen amount of the hydrogen tank 106 is equal to or more than a forecast value, the cumulative power to/from the power grid is equal to or lower than a forecast value, the PV power generation amount is equal to or more than the power consumption amount, the remaining amount of the storage battery 101 reaches an upper limit value and the hydrogen amount of the hydrogen tank 106 is less than an upper limit value, the controller 411 determines to manufacture hydrogen for FCV supply. Thus, the controller 411 determines which processing is executed based on predetermined determination criteria.

The controller 411 generates control information (operation command value) to cause a corresponding element in the renewable energy hydrogen system 100 or the energy system 200 to perform the determined processing. For example, when the controller 411 determines to cause the hydrogen manufacturing device 102 to manufacture hydrogen to be stored in the hydrogen tank 106, the controller 411 generates control information to instruct the hydrogen manufacturing device 102 to manufacture hydrogen of a certain output amount and store the hydrogen in the hydrogen tank 106. The controller 411 provides the generated control information to the transmitter 412.

The transmitter 412 transmits the control information (operation command value) to the renewable energy hydrogen system 100. The renewable energy hydrogen system 100 or the energy system 200 is provided with a receiver that receives the control information (operation command value). The renewable energy hydrogen system 100 or the energy system 200 transmits the received control information to the device to be controlled (storage battery 101, hydrogen manufacturing device 102, fuel cell 104 or hydrogen supply device 105 or the like). The device to be controlled may be the load device 900 or the power consumer 300.

(Hardware Configuration)

Figure 14:
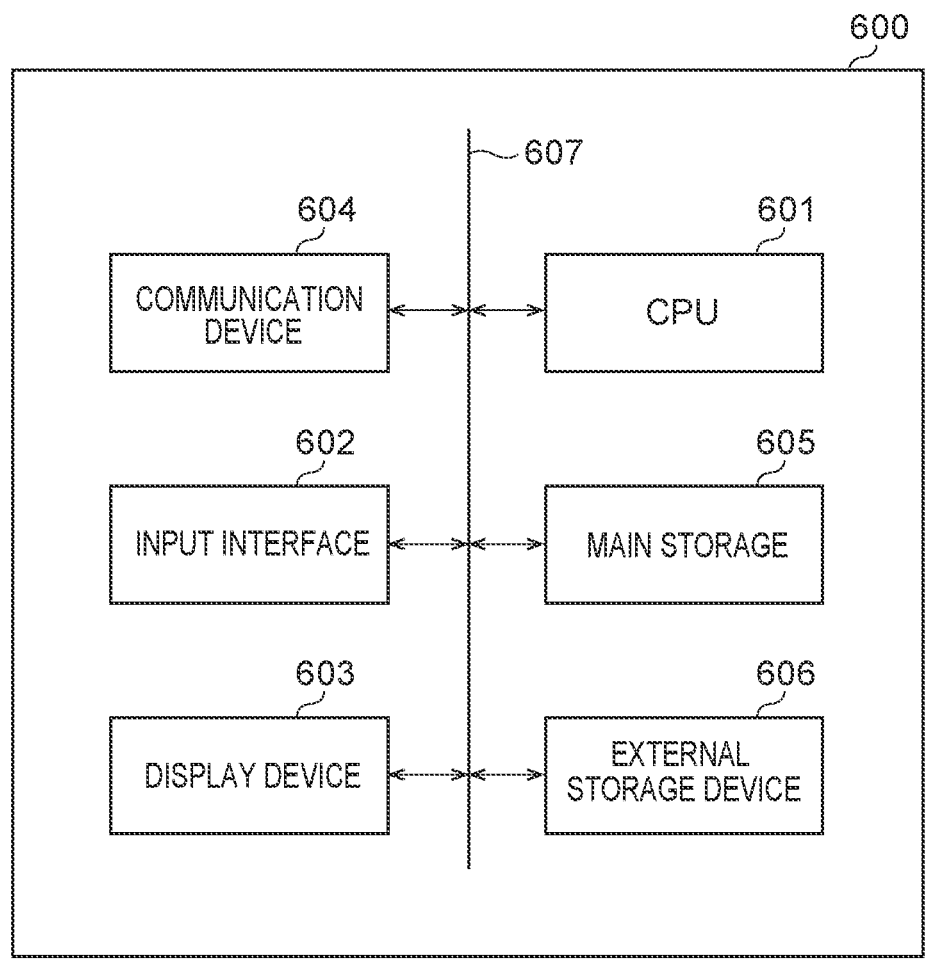
FIG. 14 is a diagram illustrating a hardware configuration of the information processing device according to the embodiment of the present invention.

FIG. 14 illustrates a hardware configuration of the information processing device according to each embodiment. The control device 400 in FIG. 13 can be realized with a similar hardware configuration. The information processing device is configured as a computer device 600. The computer device 600 includes a CPU 601, an input interface 602, a display device 603, a communication device 604, a main storage device 605, and an external storage device 606, and these components are mutually connected through a bus 607.

The CPU (central processing unit) 601 executes an information processing program as a computer program on the main storage device 605. The information processing program is a computer program configured to achieve each above-described functional component of the present device. The information processing program may be achieved by a combination of a plurality of computer programs and scripts instead of one computer program. Each functional component is achieved as the CPU 601 executes the information processing program.

The input interface 602 is a circuit for inputting, to the present device, an operation signal from an input device such as a keyboard, a mouse, or a touch panel. The input interface 602 corresponds to the input device 120.

The display device 603 displays data output from the present device. The display device 603 is, for example, a liquid crystal display (LCD), an organic electroluminescence display, a cathode-ray tube (CRT), or a plasma display (PDP) but is not limited thereto. Data output from the computer device 600 can be displayed on the display device 603.

The communication device 604 is a circuit for the present device to communicate with an external device in a wireless or wired manner. Data can be input from the external device through the communication device 604. The data input from the external device can be stored in the main storage device 605 or the external storage device 606.

The main storage device 605 stores, for example, the information processing program, data necessary for execution of the information processing program, and data generated through execution of the information processing program. The information processing program is loaded and executed on the main storage device 605. The main storage device 605 is, for example, a RAM, a DRAM, or an SRAM but is not limited thereto. Each storage or database in the information processing device in each embodiment may be implemented on the main storage device 605.

The external storage device 606 stores, for example, the information processing program, data necessary for execution of the information processing program, and data generated through execution of the information processing program. The information processing program and the data are read onto the main storage device 605 at execution of the information processing program. The external storage device 606 is, for example, a hard disk, an optical disk, a flash memory, or a magnetic tape but is not limited thereto. Each storage or database in the information processing device in each embodiment may be implemented on the external storage device 606.

The information processing program may be installed on the computer device 600 in advance or may be stored in a storage medium such as a CD-ROM. Moreover, the information processing program in each embodiment may be uploaded on the Internet.

The information processing device may be configured as a single computer device 600 or may be configured as a system including a plurality of mutually connected computer devices 600.

While certain embodiments have been described, these embodiment have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The embodiments as described before may be configured as below.

(Clauses)

Clause 1. An information processing device comprising processing circuitry configured to:
acquire operation data of an energy system comprising
a power generation device configured to generate power based on an environmental condition,
a manufacturing device configured to be able to manufacture a demanded amount using power generated by the power generation device,
a storage device configured to be able to store the demanded amount manufactured by the manufacturing device and
a supply device configured to be able to supply the demanded amount in the storage device to a demand device; and
create an operation plan of the energy system based on
the operation data and
at least one of data related to the environmental condition or first demand data related to the demanded amount necessary for the demand device.

Clause 2. The information processing device according to clause 1, wherein the operation plan of the energy system comprises at least one of:
a manufacturing plan of the demanded amount to be manufactured by the manufacturing device or
a storage amount plan that is a storage amount transition plan of the demanded amount in the storage device.

Clause 3. The information processing device according to clause 2, wherein:
the processing circuitry determines whether or not the demanded amount stored in the storage device satisfies a first demand value of the first demand data at a first point in time; and
when the demanded amount is insufficient, the processing circuitry determines a period for manufacturing the insufficient demanded amount and creates the operation plan based on the determined period.

Clause 4. The information processing device according to clause 3, wherein the first point in time is a point in time at which the demanded amount of the storage device is supplied to the demand device.

Clause 5. The information processing device according to clause 3 or 4, wherein:
the power generation device is a photovoltaic power generation device;
the data related to the environmental condition indicates solar irradiance; and
the processing circuitry forecasts an amount of power generation of the power generation device according to the solar irradiance of the data and determines the period for manufacturing the demanded amount based on the forecast amount of power generation.

Clause 6. The information processing device according to clause 5, wherein
the processing circuitry calculates total manufacturing time necessary for manufacturing the insufficient demanded amount based on information on the insufficient demanded amount, and
allocates a time period during which the forecast amount of power generation is equal to or more than a threshold to the manufacturing device, total time allocated being equal to or more than the total manufacturing time.

Clause 7. The information processing device according to clause 6, wherein the processing circuitry allocates days on which the demanded amount is manufactured to the manufacturing device in descending order of the amount of power generation among a plurality of days.

Clause 8. The information processing device according to any one of clauses 3 to 7, wherein:
the energy system comprises one or more power consumption devices different from the manufacturing device and configured to consume power; and the processing circuitry determines the period during which the demanded amount is manufactured based on second demand data related to the power consumed by the power consumption device.

Clause 9. The information processing device according to any one of clauses 4 to 8, wherein:
the demanded amount corresponds to hydrogen; and
the demand device is a fuel cell vehicle.

Clause 10. The information processing device according to any one of clauses 3 to 9, wherein:
the first demand data represents a demand of the demanded amount in a first period;
the processing circuitry creates a manufacturing plan of the demanded amount in a second period longer than the first period based on third demand data related to the demanded amount in the second period; and
even when the demanded amount stored in the storage device is sufficient for the first demand value at the first point in time in the first demand data, but the demanded amount is not sufficient for a second demand value at the first point in time of the third demand data, the processing circuitry creates a manufacturing plan for manufacturing the insufficient demanded amount for the second demand value by the first point in time as the operation plan.

Clause 11. The information processing device according to clause 10, wherein:
the energy system is enabled to input/output power to/from a power line connected to a power grid;
the energy system comprises a power storage device enabled to charge power generated of the power generation device and a power consumption device configured to consume the power;
based on the third demand data, power generation plan data of an amount of power generation of the power generation device in the second period and fourth demand data related to power consumed in the second period, the processing circuitry creates a cumulative supply-demand plan that is a plan in which power input/output of the power grid in the second period is accumulated; and
the information processing device further comprises a controller configured to control the energy system based on the cumulative supply-demand plan and the operation plan.

Clause 12. The information processing device according to clause 11, wherein
the processing circuitry minimizes or subminimizes an objective function to calculate an objective variable representing cumulative input/output power to/from the power grid using a first variable representing an amount of power generation of the power generation device, a second variable representing a charge amount of the power storage device, a third variable representing a discharge amount of the power storage device, a fourth variable representing a demanded amount manufactured by the manufacturing device and stored in the storage device and a fifth variable representing power consumption of the power consumption device, and
the processing circuitry creates the manufacturing plan based on a value of the fourth variable obtained by the minimization or the subminimization and creates the cumulative supply-demand plan based on the value of the objective variable.

Clause 13. The information processing device according to any one of clauses 1 to 12, further comprising a controller configured to control the energy system based on the operation plan.

Clause 14. The information processing device according to any one of clauses 1 to 13, wherein the demanded amount corresponds to hydrogen.

Clause 15. The information processing device according to any one of clauses 1 to 14, wherein
the data related to the environmental condition is forecast data of the environmental condition, and the first demand data is forecast data of the demanded amount necessary for the demand device.

Clause 16. An information processing method comprising:
acquiring operation data of an energy system comprising
a power generation device configured to generate power based on an environmental condition,
a manufacturing device configured to be able to manufacture a demanded amount using power generated by the power generation device,
a storage device configured to be able to store the demanded amount manufactured by the manufacturing device and
a supply device configured to be able to supply the demanded amount in the storage device to a demand device; and
creating an operation plan of the energy system based on the operation data and
at least one of data related to the environmental condition or first demand data related to the demanded amount necessary for the demand device.

Clause 17. A non-transitory computer readable medium having a computer program stored therein which when executed by a computer, causes the computer to perform processes comprising:
acquiring operation data of an energy system comprising
a power generation device configured to generate power based on an environmental condition,
a manufacturing device configured to be able to manufacture a demanded amount using power generated by the power generation device,
a storage device configured to be able to store the demanded amount manufactured by the manufacturing device and
a supply device configured to be able to supply the demanded amount in the storage device to a demand device; and
creating an operation plan of the energy system based on the operation data and
at least one of data related to the environmental condition or first demand data related to the demanded amount necessary for the demand device.

Clause 18. An information processing system comprising:
an energy system comprising
a power generation device configured to generate power based on an environmental condition,
a manufacturing device configured to be able to manufacture a demanded amount using power generated by the power generation device,
a storage device configured to be able to store the demanded amount manufactured by the manufacturing device and
a supply device configured to be able to supply the demanded amount in the storage device to a demand device;
acquisition circuitry configured to acquire operation data of the energy system; and processing circuitry configured to create an operation plan of the energy system based on
the operation data and
at least one of data related to the environmental condition or first demand data related to the demanded amount necessary for the demand device.

The invention claimed is:

1. An information processing device comprising:
processing circuitry configured to:
acquire operation data of an energy system comprising
a power generation device configured to generate power based on an environmental condition,
a manufacturing device configured to be able to manufacture a hydrogen using power generated by the power generation device,
a storage device configured to be able to store the hydrogen manufactured by the manufacturing device and
a supply device configured to be able to supply the hydrogen in the storage device to a demand device; and
create a hydrogen manufacturing plan of the hydrogen to be manufactured by the manufacturing device during a second period and a hydrogen storage amount plan which is a transition plan of storage amount of the hydrogen in the storage device during the second period, based on the operation data and a third demand data representing transition of forecast values in demand for hydrogen during the second period; and
controlling circuitry configured to control the energy system based on the manufacturing plan of the hydrogen and the hydrogen storage amount plan,
wherein
the processing circuitry acquires first demand data, which is forecast data of the demand for hydrogen at a first time point in future within the second period,
the processing circuitry determines whether a planned value of hydrogen stored in the storage device at the first time point is sufficient for a first demand value which is the forecast value of demand for hydrogen at the first time point in the first demand data and is sufficient for a second demand value which is the forecast value of demand for hydrogen at the first time point in the third demand data,
the processing circuitry creates, in a case where the planned value of hydrogen is not sufficient for at least one of the first demand value and the second demand value, a first manufacturing plan to manufacture hydrogen for shortfall against at least one of the first demand value and the second demand value and a first storage plan to store the manufactured hydrogen in the storage device, for a first period prior to the first time point within the second period, based on forecast data related to an environmental condition, and
the controlling circuitry controls the energy system based on the first manufacturing plan and the first storage plan, instead of the hydrogen storage amount plan and the hydrogen manufacturing plan, for the first period prior to the first time point.

2. The information processing device according to claim 1, wherein the first time point is a time point at which the hydrogen of the storage device is supplied to the demand device.

3. The information processing device according to claim 1, wherein:
the power generation device is a photovoltaic power generation device;
the forecast data related to the environmental condition indicates forecast values of solar irradiance for a period until the first time point; and
the processing circuitry forecasts an amount of power generation of the power generation device for each time period until the first time point according to the forecast values of the solar irradiance in the forecast data and determines the first period for manufacturing the hydrogen based on the forecasted amount of power generation.

4. The information processing device according to claim 3, wherein
the processing circuitry calculates total manufacturing time necessary for manufacturing the insufficient hydrogen based on information on the insufficient hydrogen, and
allocates time periods during which the forecasted amount of power generation is equal to or more than a threshold to the manufacturing device, a total allocated time periods is the first time period for manufacturing the hydrogen and is equal to or more than the total manufacturing time.

5. The information processing device according to claim 4, wherein each time period until the first time point is each day of a plurality of days until the first time point, and
the processing circuitry allocates days on which the forecast amount of power generation is equal to or more than the threshold to the manufacturing device in descending order of the amount of power generation among the plurality of days.

6. The information processing device according to claim 1, wherein:
the energy system comprises one or more power consumption devices different from the manufacturing device and configured to consume power generated by the power generation device; and
the processing circuitry determines the first period during which the hydrogen is manufactured based on second demand data representing a forecast value of the power consumed by the power consumption device.

7. The information processing device according to claim 2, wherein:
the demand device is a fuel cell vehicle.

8. The information processing device according to claim 1, wherein:
the energy system is enabled to input/output power to/from a power line connected to a power grid;
the energy system comprises a power storage device enabled to charge power generated of the power generation device and a power consumption device configured to consume the power charged in the power storage device or generated power of the power generation device;
based on the third demand data, power generation plan data of an amount of power generation of the power generation device in the second period and fourth demand data representing transition of forecast values of power consumed in the second period, the processing circuitry creates a cumulative supply-demand plan that represents transition of an accumulated value of power input/output of the power grid in the second period; and
the controlling circuitry controls the energy system further based on the cumulative supply-demand plan.

9. The information processing device according to claim 8, wherein
the processing circuitry minimizes or subminimizes an objective function to calculate an objective variable representing cumulative input/output power to/from the power grid using a first variable representing an amount of power generation of the power generation device, a second variable representing a charge amount of the power storage device, a third variable representing a discharge amount of the power storage device, a fourth variable representing a hydrogen manufactured by the manufacturing device and stored in the storage device and a fifth variable representing power consumption of the power consumption device, and
the processing circuitry creates the hydrogen manufacturing plan based on a value of the fourth variable obtained by the minimization or the subminimization and creates the cumulative supply-demand plan based on the value of the objective variable.

10. The information processing device according to claim 1, wherein
the power generation device is a photovoltaic power generation device,
the environmental condition indicates forecast values of solar irradiance for a period until the first time point,
the processing circuitry forecasts an amount of power generation of the photovoltaic power generation device for each time period until the first time point according to the forecast values of the solar irradiance in the forecast data and determines the first period for manufacturing the hydrogen based on the forecasted amount of power generation, and
the manufacturing device manufactures the hydrogen to be manufactured according to the hydrogen manufacturing plan.

11. An information processing method comprising:
acquiring operation data of an energy system comprising
a power generation device configured to generate power based on an environmental condition,
a manufacturing device configured to be able to manufacture a hydrogen using power generated by the power generation device,
a storage device configured to be able to store the hydrogen manufactured by the manufacturing device and
a supply device configured to be able to supply the hydrogen in the storage device to a demand device;
creating a hydrogen manufacturing plan of the hydrogen to be manufactured by the manufacturing device during a second period and a hydrogen storage amount plan which is a transition plan of storage amount of the hydrogen in the storage device during the second period, based on the operation data a third demand data representing transition of forecast values in demand for hydrogen during the second period;
controlling the energy system based on the manufacturing plan of the hydrogen and the hydrogen storage amount plan;
acquiring first demand data, which is forecast data of the demand for hydrogen at a first time point in future within the second period;
determining whether a planned value of hydrogen stored in the storage device at the first time point is sufficient for a first demand value which is the forecast value of demand for hydrogen at the first time point in the first demand data and is sufficient for a second demand value which is the forecast value of demand for hydrogen at the first time point in the third demand data;
creating, in a case where the planned value of hydrogen is not sufficient for at least one of the first demand value and the second demand value, a first manufacturing plan to manufacture hydrogen for shortfall against at least one of the first demand value and the second demand value and a first storage plan to store the manufactured hydrogen in the storage device, for a first period prior to the first time point within the second period, based on forecast data related to an environmental condition; and
controlling the energy system based on the first manufacturing plan and the first storage plan, instead of the hydrogen storage amount plan and the hydrogen manufacturing plan, for the first period prior to the first time point.

12. A non-transitory computer readable medium having a computer program stored therein which when executed by a computer, causes the computer to perform processes comprising:
acquiring operation data of an energy system comprising
a power generation device configured to generate power based on an environmental condition,
a manufacturing device configured to be able to manufacture a hydrogen using power generated by the power generation device,
a storage device configured to be able to store the hydrogen manufactured by the manufacturing device and
a supply device configured to be able to supply the hydrogen in the storage device to a demand device;
creating a hydrogen manufacturing plan of the hydrogen to be manufactured by the manufacturing device during a second period and a hydrogen storage amount plan which is a transition plan of storage amount of the hydrogen in the storage device during the second period, based on the operation data a third demand data representing transition of forecast values in demand for hydrogen during the second period;
controlling the energy system based on the manufacturing plan of the hydrogen and the hydrogen storage amount plan;
acquiring first demand data, which is forecast data of the demand for hydrogen at a first time point in future within the second period;
determining whether a planned value of hydrogen stored in the storage device at the first time point is sufficient for a first demand value which is the forecast value of demand for hydrogen at the first time point in the first demand data and is sufficient for a second demand value which is the forecast value of demand for hydrogen at the first time point in the third demand data;
creating, in a case where the planned value of hydrogen is not sufficient for at least one of the first demand value and the second demand value, a first manufacturing plan to manufacture hydrogen for shortfall against at least one of the first demand value and the second demand value and a first storage plan to store the manufactured hydrogen in the storage device, for a first period prior to the first time point within the second period, based on forecast data related to an environmental condition; and
controlling the energy system based on the first manufacturing plan and the first storage plan, instead of the hydrogen storage amount plan and the hydrogen manufacturing plan, for the first period prior to the first time point.

13. An information processing system comprising:

an energy system comprising
- a power generation device configured to generate power based on an environmental condition,
- a manufacturing device configured to be able to manufacture a hydrogen using power generated by the power generation device,
- a storage device configured to be able to store the hydrogen manufactured by the manufacturing device and
- a supply device configured to be able to supply the hydrogen in the storage device to a demand device;

processing circuitry configured to
- acquire operation data of the energy system; and
- create a hydrogen manufacturing plan of the hydrogen to be manufactured by the manufacturing device during a second period and a hydrogen storage amount plan which is a transition plan of storage amount of the hydrogen in the storage device during the second period, based on the operation data and a third demand data representing transition of forecast values in demand for hydrogen during the second period; and controlling circuitry configured to control the energy system based on the manufacturing plan of the hydrogen and the hydrogen storage amount plan, wherein the processing circuitry acquires first demand data, which is forecast data of the demand for hydrogen at a first time point in future within the second period, the processing circuitry determines whether a planned value of hydrogen stored in the storage device at the first time point is sufficient for a first demand value which is the forecast value of demand for hydrogen at the first time point in the first demand data and is sufficient for a second demand value which is the forecast value of demand for hydrogen at the first time point in the third demand data, the processing circuitry creates, in a case where the planned value of hydrogen is not sufficient for at least one of the first demand value and the second demand value, a first manufacturing plan to manufacture hydrogen for shortfall against at least one of the first demand value and the second demand value and a first storage plan to store the manufactured hydrogen in the storage device, for a first period prior to the first time point within the second period, based on forecast data related to an environmental condition, and the controlling circuitry controls the energy system based on the first manufacturing plan and the first storage plan, instead of the hydrogen storage amount plan and the hydrogen manufacturing plan, for the first period prior to the first time point.

* * * * *